US011693551B2

(12) United States Patent
Zhou et al.

(10) Patent No.: US 11,693,551 B2
(45) Date of Patent: Jul. 4, 2023

(54) METHODS AND SYSTEMS FOR PROVIDING FEEDBACK FOR MULTI-PRECISION MID-AIR GESTURES ON A GESTURE-CONTROLLED DEVICE

(71) Applicants: Wei Zhou, Richmond Hill (CA); Sachi Mizobuchi, Toronto (CA); Gaganpreet Singh, Markham (CA); Ghazaleh Saniee-Monfared, Toronto (CA); Sitao Wang, Toronto (CA); Futian Zhang, Waterloo (CA); Wei Li, Markham (CA)

(72) Inventors: Wei Zhou, Richmond Hill (CA); Sachi Mizobuchi, Toronto (CA); Gaganpreet Singh, Markham (CA); Ghazaleh Saniee-Monfared, Toronto (CA); Sitao Wang, Toronto (CA); Futian Zhang, Waterloo (CA); Wei Li, Markham (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/326,579

(22) Filed: May 21, 2021

(65) Prior Publication Data
US 2022/0374138 A1    Nov. 24, 2022

(51) Int. Cl.
G06F 3/01       (2006.01)
G06F 3/04847    (2022.01)
G06F 3/16       (2006.01)

(52) U.S. Cl.
CPC .......... G06F 3/04847 (2013.01); G06F 3/017 (2013.01); G06F 3/167 (2013.01)

(58) Field of Classification Search
None
See application file for complete search history.

(56) References Cited

U.S. PATENT DOCUMENTS 6,922,816 B1 * 7/2005 Amin ................ G06F 3/04847
                                              715/833
10,736,545 B1 * 8/2020 Berme .................. A61B 3/028
(Continued)

FOREIGN PATENT DOCUMENTS

CN    102971697 A    3/2013
CN    109478091 A    3/2019
(Continued)

OTHER PUBLICATIONS

Liu, M., Nancel, M., & Vogel, D. (Nov. 2015). Gunslinger: Subtle Arms-Down Mid-Air Interaction. In Proceedings of the 28th Annual ACM Symposium on User Interface Software & Technology.
(Continued)

Primary Examiner — Rinna Yi

(57) ABSTRACT

Devices and methods for providing feedback for a control display (CD) gain of a slider control on a gesture-controlled device are described. The method includes detecting a speed of a dynamic dragging gesture, determining the CD gain for the slider control based on the speed, and generating an auditory feedback or a visual feedback for the CD gain. A gesture-controlled device, which carries out the method, may have an image-capturing device, a processor, and a memory coupled to the processor, the memory storing machine-executable instructions for carrying out the method. Advantageously, providing feedback for CD gain of a slider control facilitates accurate adjustment of a system parameter associated with the slider control. The devices and methods may be used in industrial applications, vehicle control among other applications.

18 Claims, 23 Drawing Sheets

(56) References Cited

U.S. PATENT DOCUMENTS

| | | | | |
|---|---|---|---|---|
| 2002/0063737 | A1* | 5/2002 | Feig | G06F 3/04847 |
| | | | | 715/786 |
| 2007/0049788 | A1* | 3/2007 | Kalinowski | A61F 5/58 |
| | | | | 600/23 |
| 2008/0141181 | A1* | 6/2008 | Ishigaki | G06F 3/04847 |
| | | | | 715/863 |
| 2013/0055150 | A1 | 2/2013 | Galor | |
| 2013/0298079 | A1* | 11/2013 | Kim | G06F 3/04883 |
| | | | | 715/810 |
| 2017/0357317 | A1* | 12/2017 | Chaudhri | G06F 3/016 |
| 2018/0120944 | A1* | 5/2018 | Wang | G06F 1/163 |
| 2018/0349005 | A1* | 12/2018 | Bhargava | G06F 3/04847 |
| 2020/0379593 | A1* | 12/2020 | de Vries | G06F 3/04883 |

FOREIGN PATENT DOCUMENTS

| | | |
|---|---|---|
| CN | 112513787 A | 3/2021 |
| JP | 2010079771 A | 4/2010 |

OTHER PUBLICATIONS

Shakeri, G., Williamson, J. H., & Brewester, S. (Sep. 2017). Novel Multimodal Feedback Techniques for In-Car Mid-Air Gesture Interaction. In Proceedings of the 9th International Conference on Automative User Interfaces and Interactive Vehicular Applications.

Nancel, M., Pietriga, E., Chapuis, O., & Beaudouin-Lafon, M. (2015). Mid-air pointing on ultra-walls. ACM Transactions on Computer-Human Interaction (TOCHI), 22(5).

* cited by examiner

METHODS AND SYSTEMS FOR PROVIDING FEEDBACK FOR MULTI-PRECISION MID-AIR GESTURES ON A GESTURE-CONTROLLED DEVICE

FIELD

This disclosure relates generally to gesture-controlled devices and more specifically to methods and systems for providing feedback for multi-precision mid-air gestures on a gesture-controlled device.

BACKGROUND

Electronic devices equipped with displays respond to user interaction with user interfaces. The user interfaces may be part of desktop applications, mobile applications, web pages, and the like. It is often desirable for the electronic devices to employ feedback mechanisms for providing feedback to the user to enhance device usability and user satisfaction. The feedback mechanisms typically range from visual user interface elements to audio feedback.

Modern electronic devices, such as televisions, large display screens, and vehicle infotainment systems enable a user to interact with such electronic devices using gestures performed, for example by a user's hand, in a space in front of the electronic device. An image-capturing device, such as a camera, connected to the electronic device captures a video of the gesture. Such gestures are referred to as mid-air gestures. An electronic device, which is able to process the captured video, recognize a mid-air gesture and perform an action in response to the recognized mid-air gestures, is termed a gesture-controlled device.

Given the novelty of mid-air gestures and applications thereof, feedback mechanisms for a user-friendly system have not been fully investigated. Some work has been done to provide feedback to distinguish between a fine-grained cursor movement mode and a coarse-grained cursor movement mode by changing the shape of the cursor between the two modes. Other work has been done to distinguish between command modes in response to changing of a hand configuration in mid-air also by changing a cursor shape. For example, the cursor changes shape between a pointing mode, a pressed-down mode, a clutch (for dragging) mode and a neutral mode. Some proposed solutions provide audio feedback by playing tones with different frequencies in response to mid-air gestures such as victory sign, swipe left, swipe right, circle clockwise and circle counter clockwise.

Slider bar control widgets ("slider bars"), are user interface control elements, which include a draggable element or graphical widget (also known as a "slider element", "cursor" or "thumb") movable along a track thereof between a first end and a second end. A slider bar may be manipulated using mid-air gestures. For example, a horizontally oriented slider bar on a display of a gesture-controlled device may be manipulated by mid-air dragging hand gestures in the generally horizontal direction. In a gesture-controlled device, a control-display (CD) gain represents the proportion between movements of the hand performing a mid-air gesture and the movement of the draggable element along the track in response to the mid-air gesture. A high CD gain moves the draggable element by a large distance along the track, in response to the dragging mid-air gesture, whereas a low CD gain moves the draggable element by a small distance. A CD gain, in a gesture-controlled device, thus determines the system response rate to a mid-air gesture.

A slider bar is typically associated with a system parameter. Dragging the draggable element controls the value of the system parameter between a minimum value (when the draggable element is at the first end) and a maximum value (when the draggable element is at the second end). The precision by which the draggable element may be moved along the track cab be adjustable. In some cases, the value of a system parameter associated with a slider bar may need to be changed by a large magnitude. In this case, a high CD gain may be configured for the slider bar to allow for coarse control of the draggable element. In other cases, the value of a system parameter may need to be changed by a small magnitude. In that case, a low CD gain may be configured for the slider bar to allow for fine control of the draggable element.

It is difficult for users to determine whether a slider bar is configured with a low or a high CD gain. As such, a system parameter may be incorrectly adjusted. If there is a need to quickly adjust a system parameter's value by a large magnitude in real-time then using a low CD gain is unlikely to work as multiple mid-air gestures would be needed to make the adjustment. As an example, if a machine is running at a high speed and must be immediately slowed down, requiring multiple mid-air gestures may not slow it down quickly enough which could lead to failure or damage. If a system parameter needs to be adjusted by a small magnitude, adjusting that parameter by a large magnitude may lead to problems. For example, when steering a vehicle using mid-air dragging gesture to control a slider bar, if the CD gain is too high then the vehicle may be oversteered in one direction potentially leading to an accident.

Accordingly, improvements, which enable a user to interact with gesture-controlled device using mid-air gestures in a more precise manner, are desirable.

SUMMARY

In one aspect of the present disclosure, there is provided a method for providing feedback for a control display (CD) gain of a slider control on a gesture-controlled device. The method includes detecting a speed of a dynamic dragging gesture, determining the CD gain for the slider control based on the speed, and generating an auditory feedback or a visual feedback for the CD gain.

Advantageously, the visual or audible feedback provided enables more accurate adjustment of a slider control. As a result, a system parameter associated with the slider control is more accurately adjusted. The system parameter may be a parameter in an industrial process such as temperature, pressure, or the speed of a conveyor belt. The system parameter may be associated with controlling a vehicle. Accordingly, accurate control of the system parameter using the slider control enhances the control over many applications such as industrial processes and vehicle control.

In some examples, generating the auditory feedback or the visual feedback my comprise generating the auditory feedback including a sound played at predefined fixed intervals.

In some examples, generating the auditory feedback or the visual feedback may comprise generating the auditory feedback including playing a sound with at least one of a volume based on the CD gain and a pitch level based on the CD gain.

The auditory feedback is advantageous on systems that do not have a display device or devices that are operating with their displays off. For example, a gesture-controlled device operating in a vehicle may have its display turned off while the vehicle is in motion. If the user is performing a mid-air gesture to control a function, receiving auditory feedback allows accurate manipulation of a slider control without distracting the user.

In some examples, generating the auditory feedback or the visual feedback may comprise generating the visual feedback including a least one of adjusting a spacing of a plurality of scale ticks of a slider control based on the CD gain, and adjusting a range of the slider control based on the CD gain.

Adjusting the spacing or range of the slider control allows a user to appreciate the CD gain. As a result, the parameter associated with the slider control is accurately manipulated leading to precise operation of the machine, vehicle or process associated with a system parameter corresponding to the slider control.

In some example, generating the auditory feedback or the visual feedback may comprise generating the visual feedback including displaying a ruler visualization when the CD gain is below a predefined threshold.

Advantageously, for CD gain ranges that are high the user interface is kept simple and uncluttered. However, when the CD gain drops below a particular threshold, the ruler provides visual feedback allowing the user to accurately adjust the slider control, which, in turn, adjusts a system parameter. As a result the machine, vehicle or process associated with the system parameter is precisely operated.

In some examples, generating the auditory feedback or the visual feedback may comprise generating the visual feedback including altering an appearance of a draggable element of the slider control based on the CD gain.

In some examples, generating the auditory feedback or the visual feedback may comprise generating the visual feedback including adjusting a thickness of a track of the slider control based on the CD gain.

In some examples, altering the appearance of the draggable element based on the CD gain may comprise one of displaying the draggable element in a color based on the CD gain, adjusting a width of the draggable element based on the CD gain, and displaying a tail for the draggable element, the tail having a length based on the CD gain.

Altering the appearance of the draggable element has the advantage of providing an indication of the CD gain without complicating the user interface. It is also unlikely that the CD gain feedback will be missed as the user would be looking at the draggable element while performing the gesture. As a result, accurate adjustment of the slider control and its associated system parameter In some examples, generating the auditory feedback or the visual feedback may comprise generating the visual feedback including displaying an indicator along the slider control, the indicator providing an indication of the CD gain.

In some examples, the indicator may comprise one of an arrow having a length based on the CD gain, a speedometer having a pointer indicating the CD gain, and an animation, which updates based on the CD gain.

In another aspect of the present disclosure, there is provided a gesture-controlled device comprising an image-capturing device, a processor, and a memory coupled to the processor, the memory storing machine-executable instructions. The machine-executable instructions, when executed by the processor, cause the gesture-controlled device to detect a speed of a dynamic dragging gesture captured by the image-capturing device, determine a CD gain for a slider control based on the speed, and generate an auditory feedback or a visual feedback for the CD gain.

Advantageously, the visual or audible feedback provided enables more accurate adjustment of a slider control. As a result, a system parameter associated with the slider control is more accurately adjusted. The system parameter may be a parameter in an industrial process such as temperature, pressure, or the speed of a conveyor belt. The system parameter may be associated with controlling a vehicle. Accordingly, accurate control of the system parameter using the slider control enhances the control over many applications such as industrial processes and vehicle control.

In some examples, the machine-executable instructions may cause the gesture-controlled device to generate an auditory feedback, comprising a sound played at predefined fixed intervals.

In some examples, the machine-executable instructions may cause the gesture-controlled device to generate an auditory feedback including playing a sound with at least one of a volume based on the CD gain, and a pitch level based on the CD gain.

The auditory feedback is advantageous on systems that do not have a display device or devices that are operating with their displays off. For example, a gesture-controlled device operating in a vehicle may have its display turned off while the vehicle is in motion. If the user is performing a mid-air gesture to control a function, receiving auditory feedback allows accurate manipulation of a slider control without distracting the user.

In some examples, the machine-executable instructions may cause the gesture-controlled device to generate a visual feedback including at least one of adjusting a spacing of a plurality of scale ticks of a slider control based on the CD gain, and adjusting a range of the slider control based on the CD gain.

In some examples, the machine-executable instructions may cause the gesture-controlled device to generate a visual feedback including displaying a ruler visualization when the CD gain is below a predefined threshold.

Advantageously, for CD gain ranges that are high the user interface is kept simple and uncluttered. However, when the CD gain drops below a particular threshold, the ruler provides visual feedback allowing the user to accurately adjust the slider control, which, in turn, adjusts a system parameter. As a result the machine, vehicle or process associated with the system parameter is precisely operated.

In some examples, the machine-executable instructions may cause the gesture-controlled device to generate a visual feedback including altering an appearance of a draggable element of the slider control based on the CD gain.

In some examples, the machine-executable instructions may cause the gesture-controlled device to generate a visual feedback including adjusting a thickness of a track of the slider control based on the CD gain.

In some examples, altering the appearance of the draggable the draggable element based on the CD gain comprises one of displaying the draggable element in a color based on the CD gain, adjusting a width of the draggable element based on the CD gain, and displaying a tail for the draggable element, the tail having a length based on the CD gain.

Altering the appearance of the draggable element has the advantage of providing an indication of the CD gain without complicating the user interface. It is also unlikely that the CD gain feedback will be missed as the user would be looking at the draggable element while performing the gesture. As a result, accurate adjustment of the slider control and its associated system parameter In some examples, the machine-executable instructions may cause the gesture-controlled device to generate visual feedback including displaying an indicator along the slider control, the indicator providing an indication of the CD gain.

In yet another aspect of the present disclosure there is provided a non-transitory computer-readable medium having machine-executable instructions stored thereon. The machine-executable instructions, when executed by a processor of a gesture-controlled device, cause the gesture-controlled device to detect a speed of a dynamic dragging gesture, determine a CD gain for a slider control based on the speed, and generate an auditory feedback or a visual feedback for the CD gain.

Advantageously, the visual or audible feedback provided enables more accurate adjustment of a slider control. As a result, a system parameter associated with the slider control is more accurately adjusted. The system parameter may be a parameter in an industrial process such as temperature, pressure, or the speed of a conveyor belt. The system parameter may be associated with controlling a vehicle. Accordingly, accurate control of the system parameter using the slider control enhances the control over many applications such as industrial processes and vehicle control.

BRIEF DESCRIPTION OF THE DRAWINGS

Reference will now be made, by way of example, to the accompanying drawings, which show example embodiments of the present application, and in which.

DESCRIPTION OF EXAMPLE EMBODIMENTS

Figure 1:
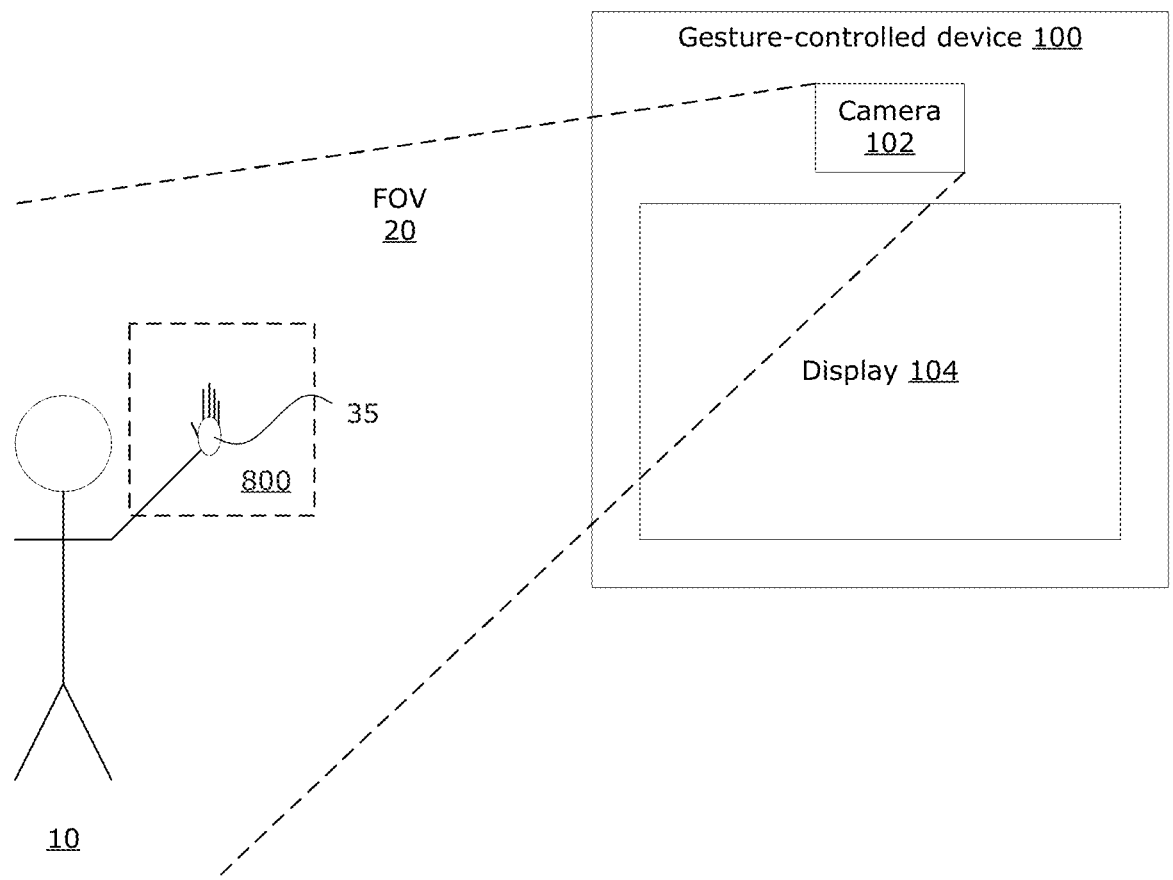
FIG. 1 is a diagram illustrating a user interacting with a gesture-controlled device.

The present disclosure describes methods and systems for providing feedback for multi-precision mid-air gestures on a gesture-controlled device, which may overcome the problems cited above in the background section. Various visual and auditory feedback mechanisms which make the system response rate (i.e. CD gain) easily comprehensible for users.

The presented embodiments relate to providing feedback for multi-precision control of a user interface (UI) control element displayed on a display of a gesture-controlled device. The UI control element may include a draggable element (e.g., a graphical widget) and the UI control element may be associated with a system parameter of the gesture-controlled device. Recognition of manipulation (e.g., movement) of the draggable element of the UI control element may cause adjustment of a system parameter of the gestured-controlled device, such as a magnitude of the system parameter associated with the UI control element. Examples of system parameters include audio-visual parameters such as contrast, brightness, color, and volume for a display device. Other examples of system parameters that are adjustable by manipulation of a draggable element of the UI control element include industrial process parameters, mechanical motion parameters such as range of motion and speed, and other physical parameters such as temperature, pressure, and humidity, etc.

Examples of a UI control element include a scroll bar, a slider, a rotary control element, and a progress bar. Examples of draggable elements include a thumb, a slider, a rotating element, a widget, and a knob, etc. Examples of such system parameters include contrast, time, volume, brightness, zooming/panning magnification. A gesture-controlled device may be a television (e.g., smart TV), a desktop device, a videoconferencing system, a video gaming system, a vehicle-coupled device (e.g., a dashboard device), an augment reality (AR) or virtual reality (VR) system, or a smart speaker, among other possibilities.

The methods and systems described herein recognize user interaction with any UI control element displayed on a display of the gesture-controlled device using a mid-air gesture. Recognition of interaction with a UI control element includes recognition of a mid-air gesture associated with the UI control element. Examples of the methods and systems of the present disclosure also enable multi-precision discrete control of a UI control element displayed in an interaction space rendered by augmented reality (AR) or virtual reality (VR) system, among other possibilities.

In this disclosure, a "hand gesture" refers to a mid-air hand gesture in which a human hand has assumed a particular configuration or the human hand has moved in a particular way in mid-air. In the present disclosure, the terms "mid-air gesture", "hand gesture", and "gesture" shall be used interchangeably to refer to a gesture performed by a user's hand within the field of view of a camera, as described in further detail below.

In this disclosure, a "static hand gesture" is a gesture performed by a human hand, in which the human hand persists in the same position, has the same orientation, and the fingers of the human hand have the same configuration for a duration of time. For example, a "pinched open" hand gesture is a static hand gesture in which the human hand is maintained in an "pinch open" hand configuration in the same position with the same orientation and the same configuration of its fingers for a duration of time, such as for a few seconds. A "pinched closed" hand gesture is a static hand gesture in which the human hand is maintained in a "pinch-closed" hand configuration in the same position with the same orientation and the same configuration of its fingers for a duration of time, such as for a few seconds.

In this disclosure, as shown in FIG. 1, a "dynamic hand gesture" is a gesture performed by the hand 35 during which the hand 35 changes its position in space, the hand 35 changes its orientation in space, or the fingers of the hand 35 change their configuration in space over a duration of time. An example of a "dynamic hand gesture" is a dragging hand gesture. A dragging hand gesture comprises a hand 35 having a particular orientation and configuration (e.g., a pinch open hand configuration or a pinch-closed hand configuration 30) and the hand 35 moving in space in a generally horizontal or generally vertical direction, relative to a video frame 800 containing an image of the hand 35, over a duration of time.

In this disclosure, "dragging mode" is a user input mode for a UI control element to enable interaction with and manipulation of a draggable element of the UI control element.

With reference to FIG. 1, an example of a user 10 interacting with a gesture-controlled device 100 is shown. In this simplified diagram, the gesture-controlled device 100 includes an image-capturing device in the form of a camera such as a digital camera 102 that captures a plurality of video frames (images) in a field-of-view (FOV) 20 of the digital camera 102. The FOV 20 may include at least a portion of the user 10, for example, a face and a hand of the user 10, performing a mid-air hand gesture as discussed further below. Notably, the FOV 20 in real-life use (e.g., outside of a laboratory setting) typically includes more than just the user 10. For example, the FOV 20 may also include other objects, a background scene, or possible other humans. The gesture-controlled device 100 may execute instructions, which direct the digital camera 102 to capture video frames 800 of the user's hand 35 to capture and process mid-air hand gestures, as will be described below. For example, the digital camera 102 may be turned towards the user's hand 35, zoomed in on the user's hand 35, or the captured video frames 800 by the digital camera 102 may be cropped to provide captured video frames 800 of the user's hand 35. The gesture-controlled device 100 may, instead of or in addition to the digital camera 102, include another sensor capable of sensing mid-air hand gestures performed by the user 10, for example, any image-capturing device/sensor (e.g., an infrared image sensor). Additionally, the gesture-controlled device 100 includes a combination of hardware and software components, which process the captured video frames to recognize different mid-air hand gestures performed by the user 10. The gesture-controlled device 100 also includes a display device (hereinafter referred to as display 104) for displaying visual information thereon, such as a video and a user interface that includes draggable UI elements. A more detailed block diagram showing the components of the gesture-controlled device 100 is described below with reference to FIG. 2.

Figure 2:
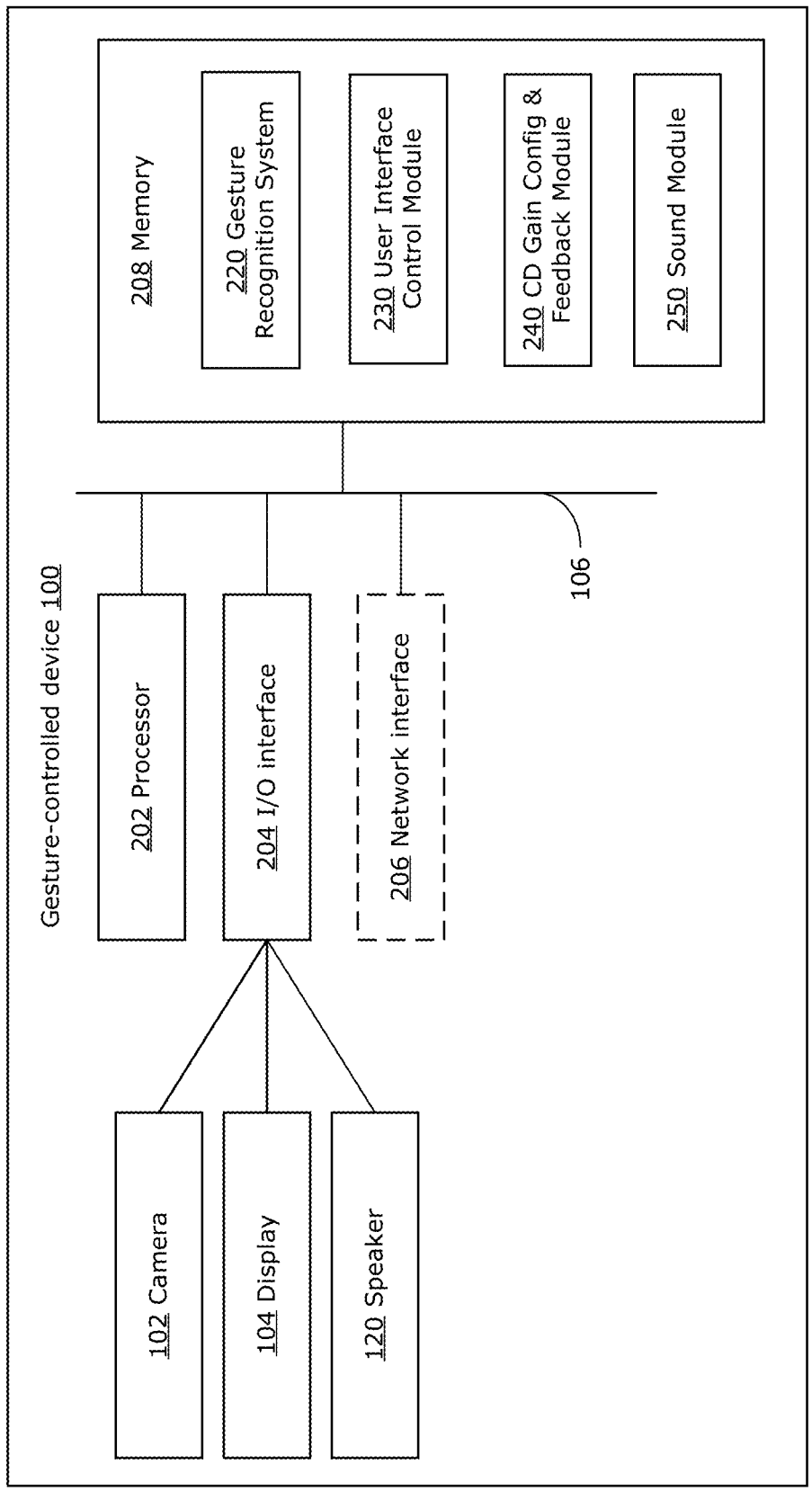
FIG. 2 is a block diagram illustrating some components of an example of the gesture-controlled device of FIG. 1 in accordance with embodiments of the present disclosure.

Referring to FIG. 2, a block diagram of the gesture-controlled device 100 is shown. Although an example embodiment of the gesture-controlled device 100 is shown and discussed below, other embodiments may be used to implement examples disclosed herein, which may include components different from those shown. Although FIG. 2 shows a single instance of each component of the gesture-controlled device 100, there may be multiple instances of each component shown.

The gesture-controlled device 100 includes one or more processors 202, such as a central processing unit, a microprocessor, an application-specific integrated circuit (ASIC), a field-programmable gate array (FPGA), a dedicated logic circuitry, a tensor processing unit, a neural processing unit, a dedicated artificial intelligence processing unit, or combinations thereof. The gesture-controlled device 100 also includes one or more input/output (I/O) interfaces 204, which interfaces input devices such as the digital camera 102 and output devices such as the display 104. The gesture-controlled device 100 may include other input devices (e.g., buttons, microphone, touchscreen, keyboard, etc.) and other output devices (e.g., speaker, vibration unit, etc.). The digital camera 102 (or other input device) may have capabilities for capturing live gesture input as a sequence of video frames. The captured video frames may be buffered by the I/O interface(s) 204 and provided to the processor(s) 202 to be processed in real-time or near real-time (e.g., within 100 ms).

The gesture-controlled device 100 may include one or more optional network interfaces 206 for wired or wireless communication with a network (e.g., an intranet, the Internet, a peer-to-peer (P2P) network, a wide area network (WAN) and/or a local area network (LAN)) or other node. The network interface(s) 206 may include wired links (e.g., Ethernet cable) and/or wireless links (e.g., one or more antennas) for intra-network and/or inter-network communications.

The gesture-controlled device 100 includes one or more memories 208, which may include a volatile or non-volatile memory (e.g., a flash memory, a random access memory (RAM), and/or a read-only memory (ROM)). The non-transitory memory(ies) 208 may store instructions for execution by the processor(s) 202, such as to carry out examples described in the present disclosure. The memory(ies) 208 may include other software instructions, such as for implementing an operating system and other applications/functions. The gesture recognition system 220 is a software module, component or system, residing in the memory 208, and is configured to obtain the frames of a video captured by the digital camera and to process the obtained video frames using image processing and recognition methods to recognize a plurality of pre-defined types of mid-air hand gestures therein. For example, the gesture recognition system 220 may implement a trained machine-learning model, which receives frames of a video captured by the digital camera 102 and processes the frames of the video to recognize mid-air hand gestures therein. The machine-learning model is trained using a training dataset, a supervised learning algorithm, and a loss function to learn parameters of the machine-learning model. The training dataset includes a plurality of labeled training samples where each labeled training sample is an input-output pair that includes a frame (i.e. digital video) that contains a mid-air hand gesture performed by a user and a ground truth label identifying a type of mid-air hand gesture performed by the user. In some embodiments, the machine-learning model may be a trained neural network model, such as a trained convolutional neural network (CNN) model that is configured to recognize a mid-air gestures performed by a user in a plurality of frames of a video captured by the digital camera 102. A trained convolutional neural network (CNN) that approximates a trained machine-learning model is generally referred to as a trained CNN model. A trained CNN model includes weights and biases learned during training of the CNN.

The gesture recognition system 220 is coupled to the UI control module 230 and provides recognized hand gestures to the UI control module 230. The UI control module 230 configures a UI control element, by moving the draggable element (e.g. a draggable widget) of the UI control element, upon receipt of hand gestures from the gesture recognition system 220 as described in further detail below. While in the example shown in FIG. 2, the gesture recognition system 220 and the UI control module 230 are shown as separate components, in other examples they may be integrated together in a single module.

The CD gain configuration and feedback module ("CD gain module 240" for short) is a software module residing in the memory 208, which determines hand speed in a recognized hand gesture provided by the gesture recognition system, sets the CD gain based on a determined hand speed, and provides CD gain feedback to the user indicating the currently set CD gain. In some embodiments, where CD gain feedback is visual, the CD gain module 240 is coupled to the UI control module 230 and provides feedback by configuring a UI control element, such as a slider bar in a manner indicative of the current CD gain. In other embodiments, CD gain feedback is audible, in which case the CD gain module 240 is coupled to an audio module or a speaker 120 to generate tones indicative of the current CD gain.

In some examples, the gesture-controlled device 100 may also include one or more electronic storage units (not shown), such as a solid state drive, a hard disk drive, a magnetic disk drive and/or an optical disk drive. In some examples, one or more data sets and/or modules may be provided by an external memory (e.g., an external drive in wired or wireless communication with the gesture-controlled device 100) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage. The components of the gesture-controlled device 100 may communicate with one another via a bus 106, for example.

In some embodiments, a distributed system may include multiple gesture-controlled devices 100 as well as optionally one or more additional components. The distributed system may include multiple gesture-controlled devices 100 in communication with one another over a network. In some embodiments, the distributed system is an augmented reality system that includes a gesture-controlled device 100, multiple digital cameras (e.g. a digital camera array positioned around a physical space) and a single head-mounted display. In this embodiment, the gesture-controlled device 100 is configured to process frames of a video captured by the multiple digital cameras of the distributed system to recognize mid-air hand gestures performed by a user of the gesture-controlled device 100. The gesture-controlled device 100 discretely controls (e.g. moves) a draggable UI element displayed by the head mounted display based on the recognized mid-air hand gestures as described in further detail below. It will be appreciated that these distributed systems are provided as examples, and that other distributed systems are possible.

It will be appreciated that different embodiments may include different combinations of input and output devices in place of, or in addition to, the digital camera 102 and display 104. Feedback information may be provided to the user of such a VR or AR system by displaying, movement of the draggable UI control element using the head-mounted display.

In some embodiments, a distributed system may be a VR or AR system that includes multiple digital cameras 102 that capture videos containing frames (i.e. digital images) of different users performing mid-air hand gestures. For example, a VR or AR system may include a separate digital camera mounted on each user's headset or other VR or AR device, with each user's respective digital camera used to capture video containing frames of the respective user performing mid-air hand gestures. The VR or AR system with multiple users located remotely from one another could use digital cameras local to each user to capture that user's body and environment in order to capture a video of that user performing a mid-air hand gestures. In such an example multi-camera embodiment, the methods and systems described herein could be used to detect, track, and recognize each user's mid-air hand gestures by combining the frames captured by each digital camera. This plurality of frames received from multiple digital cameras could be combined temporally in some embodiments (e.g. processing each frame for gesture recognition sequentially), spatially in some embodiments (e.g. creating a composite video frame encompassing the current frame from each digital camera, and processing the composite frame for gesture recognition), or by some other method of combining frames from multiple digital cameras.

Figure 3:
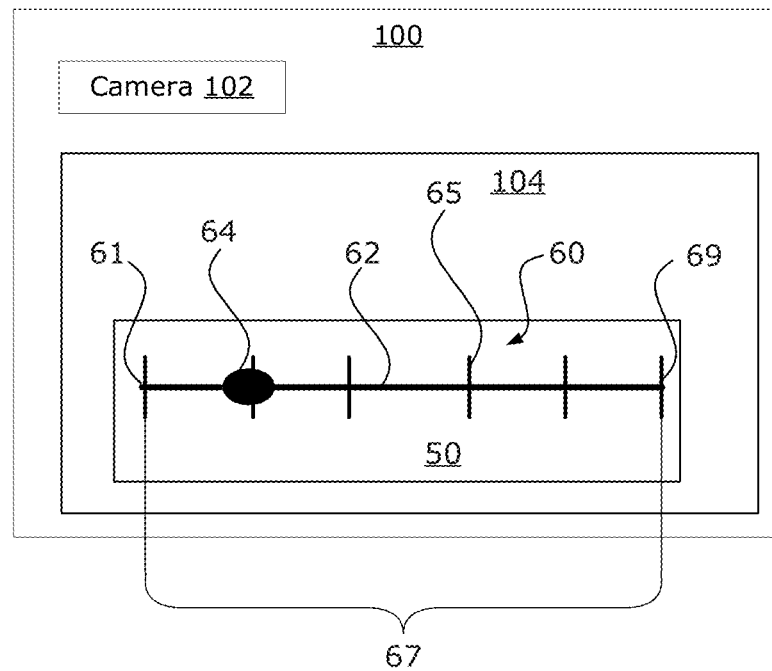
FIG. 3 is a diagram illustrating a slider bar shown on a display of the gesture-controlled device of FIG. 1.

Referring now to FIG. 3, there is shown a gesture-controlled device 100 having a display 104 on which there is displayed at least a portion of a user interface 50 of a media application. The portion of the user interface 50 includes a UI control element that is a slider bar control widget ("slider bar") 60. The slider bar 60 is used to control a system parameter, such as audio volume, brightness or contrast of the display 104, while the gesture-controlled device 100 is running the media application. The system parameter associated with the slider bar 60 is adjusted (e.g. moved) by the UI control module 230 by moving a slider element (also known as a "cursor" or a "thumb") 64 of the slider bar 60 along a track 62 of slider bar 60. The system parameter is set to its minimum possible value when the slider element 64 is at the left end 61 of the track 62. The distance between the right end 69 and the left end 61 is defined as the range of the slider bar 60. The range 67 of the slider bar is divided into segments or spaces by a plurality of scale ticks 65 placed at predefined intervals. The range of values of the system parameter associated with the slider bar is related to the range 67 of the slider bar 60 by the CD gain. The system parameter associated with the slider bar 60 is set to its maximum possible value when the slider element 64 is at the right end 69 of the track 62. Adjustments of the system parameter associated with the slider bar 60 are enabled upon activation of a dragging mode for the slider bar 60 by the gesture-controlled device 100.

In this disclosure, a "hand gesture" refers to a mid-air hand gesture in which a human hand has assumed a particular configuration or the human hand has moved in a particular way in mid-air. While the embodiments presented herein show gestures performed by the hand, the presented systems and methods are not limited in this regard. For example, mid-air gestures may be performed while holding a pointing device. In the present disclosure, the terms "mid-air gesture", "hand gesture", and "gesture" shall be used interchangeably to refer to a gesture performed by a user's hand or a pointing device within the field of view of a camera, as described in further detail below.

In this disclosure, a "static hand gesture" is a gesture performed by a human hand, in which the human hand persists in the same position, has the same orientation, and the fingers of the human hand have the same configuration for a duration of time. For example, a "pinched open" hand gesture is a static hand gesture in which the human hand is maintained in an "pinch open" hand configuration in the same position with the same orientation and the same configuration of its fingers for a duration of time, such as for a few seconds. A "pinched closed" hand gesture is a static hand gesture in which the human hand is maintained in a "pinch-closed" hand configuration in the same position with the same orientation and the same configuration of its fingers for a duration of time, such as for a few seconds.

Figure 4:
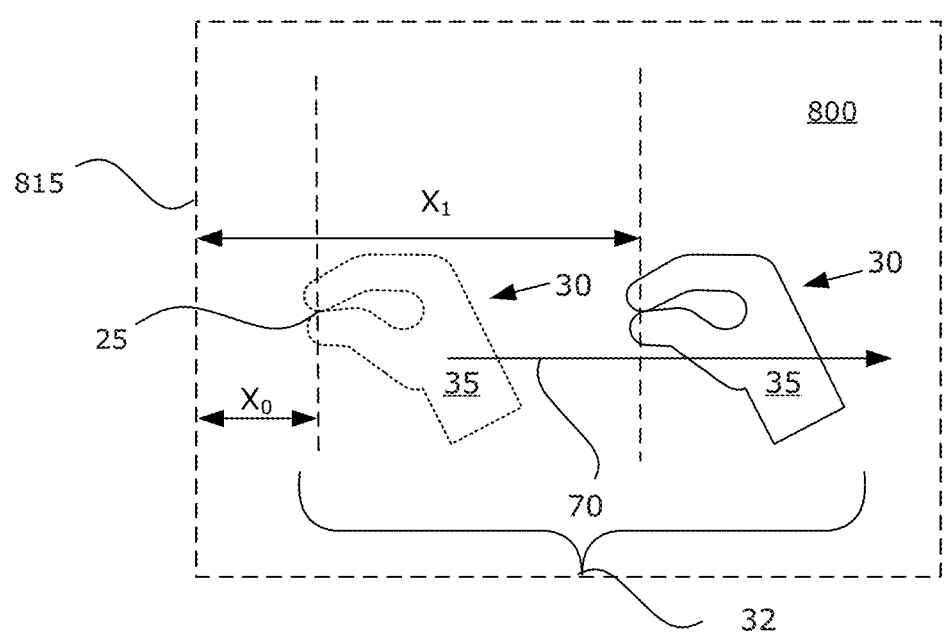
FIG. 4 is a diagram illustrating a horizontal dragging mid-air hand gesture in a video frame.

The slider element 64 of the slider may be moved or dragged along the track 62 in response to a dragging mid-air hand gesture. For example, with reference to FIG. 4, a dynamic dragging gesture 32 performed by a user in the right direction 70 is shown. The dynamic dragging gesture 32 may be captured by an image-sensing device of a gesture-controlled device 100. A gesture recognition system 220 then detects the position of the hand 35 within the video frame 800 captured by the image-capturing device, such as digital camera 102. In the depicted gesture, the hand 35 is in a pinch-closed configuration but other hand configurations may also be used. The hand 35 of a user is shown in dotted lines when, in an initial position defined by the distance $X_0$ from the left edge 815 of the video frame 800. After the dynamic dragging gesture 32 is performed in the right direction 70, the hand 35 is at a subsequent position defined by the subsequent horizontal distance $X_1$ from the left edge 815 of the video frame 800, and is shown in solid lines. Accordingly, while performing the dynamic dragging gesture 32, the hand 35 has moved a distance of $X_1-X_0$, as shown in FIG. 4. The type of dynamic hand gesture and the distance travelled by the hand 35 are determined by the gesture recognition system 220 as will be described below.

Figure 5:
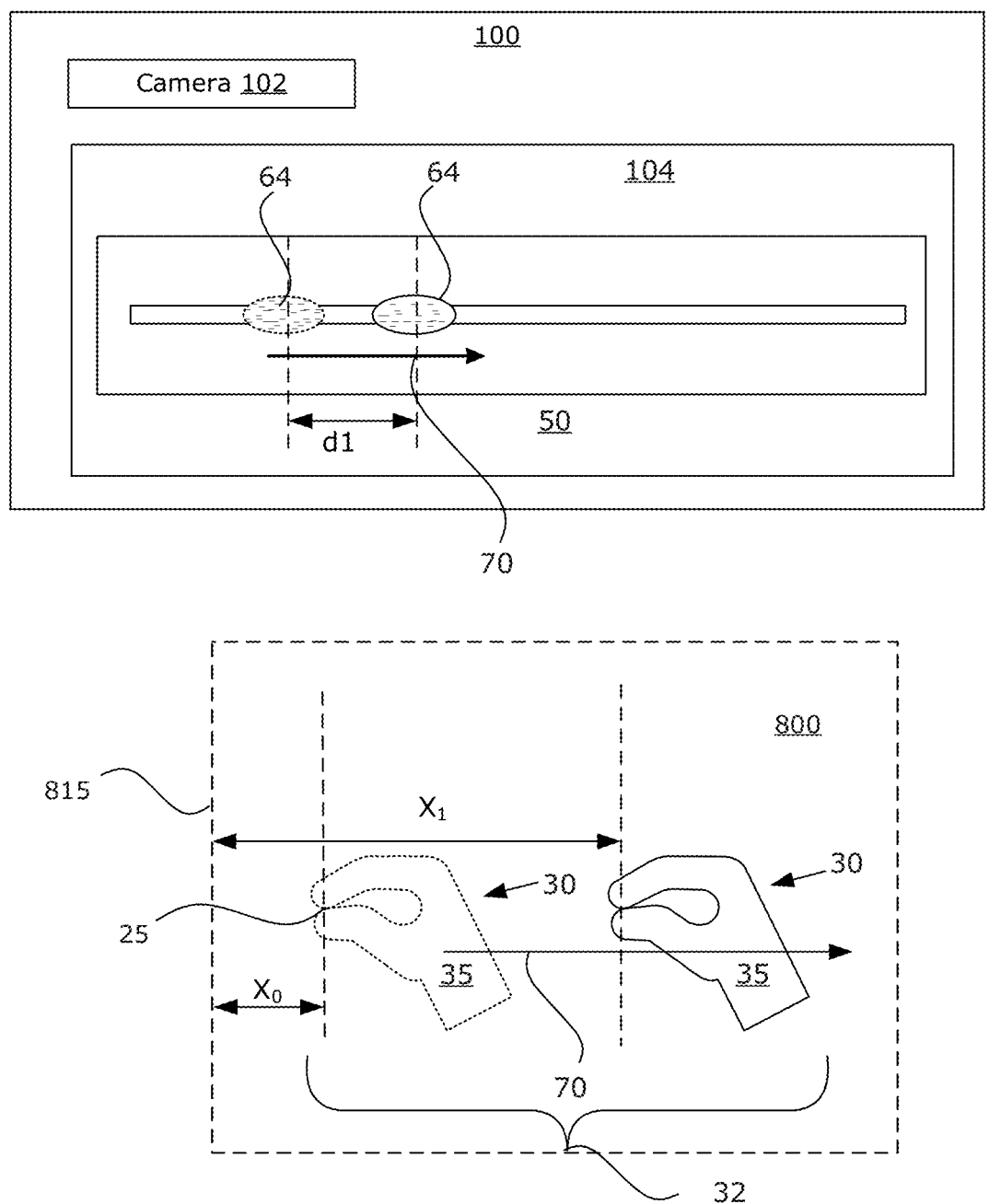
FIG. 5 is a diagram illustrating controlling the slider bar of FIG. 3 being controlled by the mid-air hand gesture of FIG. 4, with a high control display (CD) gain.
Figure 6:
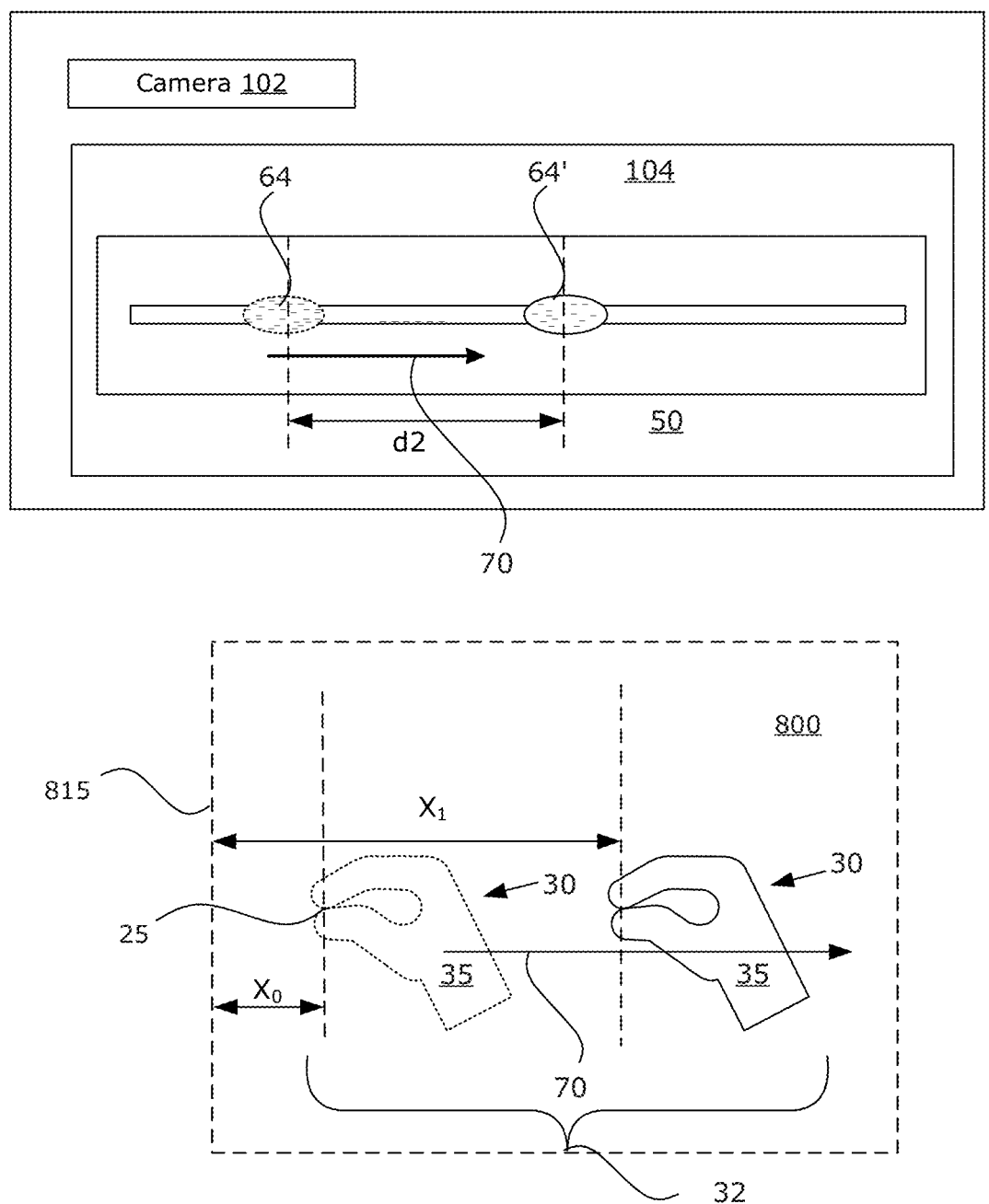
FIG. 6 is a diagram illustrating controlling the slider bar of FIG. 3 being controlled by the mid-air hand gesture of FIG. 4, with a low CD gain

A UI control module 230 receives the gesture type and the distance $X_1-X_0$ from the gesture recognition system 220. The UI control module 230 is configured to move a slider element 64 of a slider bar 60 in response to a dynamic dragging gesture 32. This is shown in FIG. 5 and FIG. 6. The distance by which the slider element 64 is moved in response to the dynamic dragging gesture is based on two factors. The first factor is the distance $X_1-X_0$ travelled by the hand 35 when it is performing the dynamic dragging gesture 32. For example, if the distance $X_1$ is much larger than $X_0$ then the hand has travelled a large distance across the video frame 800 indicating that the slider element 64 is intended to be moved by a large distance along the track 62. The second factor, which determines the distance by which the slider element 64 is moved, is the CD gain described above. In general, a distance (d) travelled by the slider element 64 in response to a dragging hand gesture may be specified as:

$$d=(X_1-X_0)*CD_{gain}.$$

To illustrate the effect of the CD gain ($CD_{gain}$), the dynamic dragging gestures 32 recognized by the gesture-controlled device 100 in FIG. 5 and FIG. 6 have the same displacement ($X_1-X_0$), and the difference between the two figures is only in the CD gain.

With reference to FIG. 5, the CD gain has been configured to have a low value. Accordingly, the displacement $X_1-X_0$ of the hand 35 performing a dynamic dragging gesture in the right direction 70, is multiplied by a small CD gain value. As a result, the UI control module 230 causes the slider element 64 to be moved by a short distance $d_1$. Conversely, with reference to FIG. 6, the CD gain has been configured to have a high value. Accordingly, the displacement $X_1-X_0$ is multiplied by the high CD gain value. As a result, the UI control module 230 moves the slider element by a long distance $d_2$, which is greater than $d_1$. However, a user performing the dynamic dragging gesture 32 for example is unaware of the CD gain and may end up moving the slider element 64 by a distance, which is not intended.

Different methods exist for setting or adjusting the CD gain for one or more user interface controls. Some methods are static wherein a user interface control is manipulated to select a certain CD gain value in a manner similar to adjusting mouse sensitivity in a graphical operating system. With static CD gain adjustment methods, the CD gain is typically configured by a separate user interface control in advance of performing a gesture to move a user interface element, such as the slider element 64. Other methods may adjust the CD gain dynamically based on the speed of the hand 35 performing the dynamic dragging gesture 32 used to move the draggable element of a user interface control. In other words, the same gesture, which is used to move a draggable element, is also used to determine the CD gain, which in turn determines the granularity of the movement of the draggable element. For example, the faster the speed of the hand 35 during the dynamic gesture, the higher the CD gain value.

As discussed above, the gesture recognition system 220 determines a gesture type and the initial and subsequent positions of the hand 35 associated with the gesture. Each of the first and second positions are also associated with a time stamp. For example, the position $X_0$ may be associated by a time stamp $t_0$, and the subsequent position $X_1$ may be associated with a timestamp $t_1$. The time taken for the hand 35 to move from the first position to the second position is therefore $(t_1-t_0)$. The CD gain module 240 can first compute the speed (v) by which the hand 35 has moved from the initial position X0 to the subsequent position X1 by dividing the distance $(X_1-X_0)$ by the time $(t_1-t_0)$. In some example embodiment, the speed (v) of the hand 35 during the dynamic dragging gesture is multiplied by a constant value to arrive at the CD gain, or $CD_{gain}=C^*v$, wherein c is a predefined constant and v is the speed of the hand. In this example, it is assumed that speed (v) is constant throughout the dynamic dragging gesture.

In other example embodiments, the hand 35 may be moved with varying speeds throughout the dynamic dragging gesture 32. In this case, the speed (v) changes dynamically with time between initial and final positions of the hand 35. In this embodiment, the gesture recognition system 220 recognizes a number of sub-gestures and provides them to the CD gain module during the dynamic gesture, such as dynamic dragging gesture 32. Each sub-gesture may be defined by a first position $X_i$ and a second position $X_{i+1}$. In other words, the position of the hand 35 is checked at many intermediate positions between $X_0$ and $X_1$. The velocity is determined, by the CD gain module 240, between any two successive and adjacent positions $X_i$ and $X_{i+1}$, i.e. for each sub-gesture. Accordingly, as the hand 35 is accelerated during the dynamic dragging gesture 32, the CD gain increases. Conversely, as the hand 35 is decelerated during the dynamic dragging gesture 32, the CD gain decreases. However, in order for the user to know when to accelerate and when to decelerate, a user needs an indication of the currently active CD gain value. A mechanism of indicating which CD gain value is active at a given time assists the user in gaining a better understanding of how they should interact with a device or system employing that mechanism. For example, if the user determines that the current CD gain is too low, the user may move the hand faster during the dragging gesture. Conversely, if the user determines that the current CD gain is too high, the user may move the hand slower during the dragging gesture.

In some embodiments of the present disclosure, adaptive auditory feedback is used with electronic devices that support dynamic CD gain adjustment based on the user hand's speed. In one embodiment, the volume of an audio tone is varied to indicate the active CD gain. In another embodiment, the pitch level of an audio tone can be utilized to provide auditory cues on the CD gain.

Figure 7:
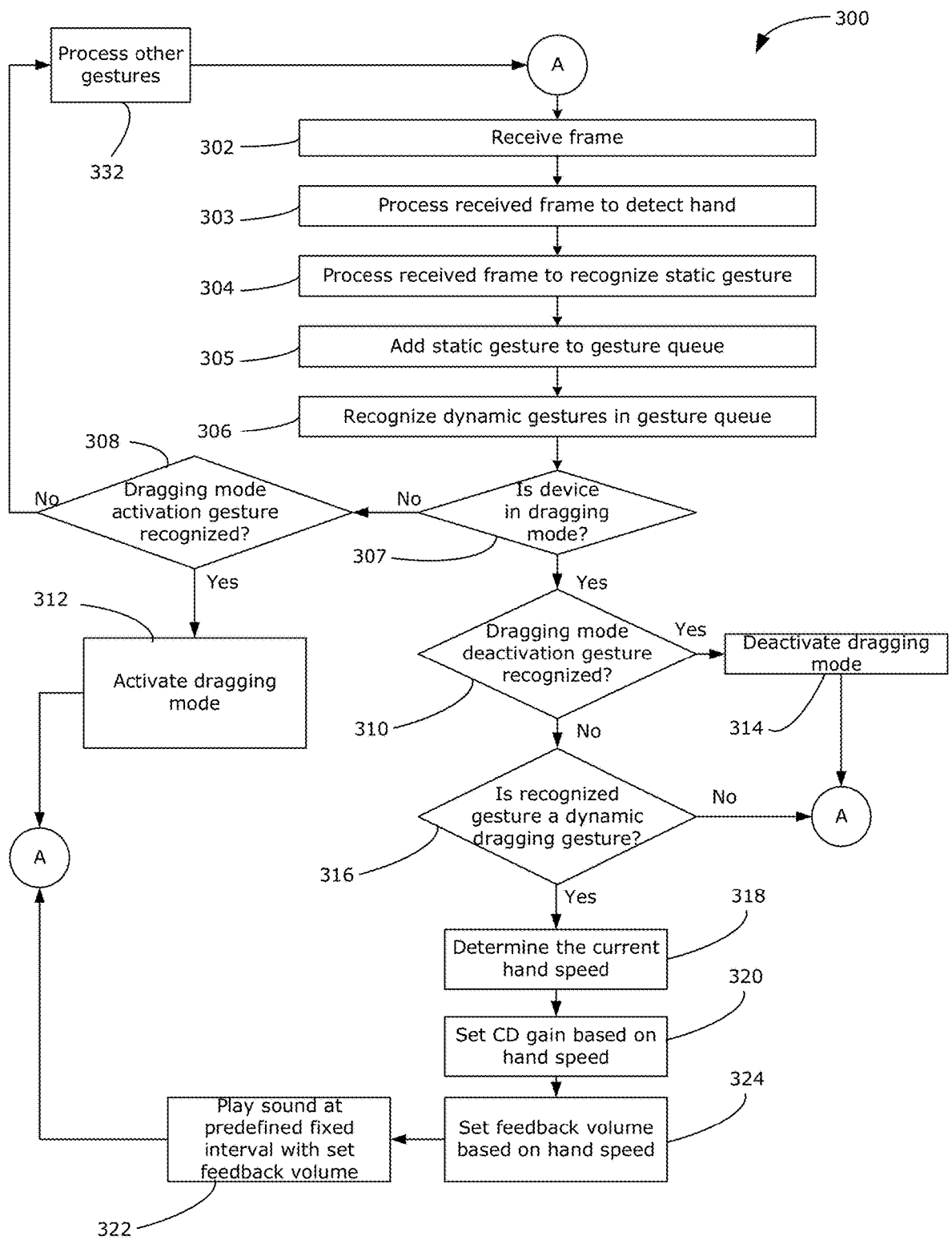
FIG. 7 is a flow chart illustrating a method for providing auditory feedback for the CD gain of a slider control on a gesture-controlled device by varying an audio volume, in accordance with embodiments of the present disclosure.

With reference to FIG. 7, there is shown a method 300 for providing adaptive auditory feedback for the active CD gain value by varying the volume level of a system sound. The method begins at step 302. At step 302, a video frame 800 of a video captured by the digital camera 102 is obtained by the gesture recognition system 220. At step 303, the captured video frame 800 is processed to detect a hand 35 of a user. At step 304, the received frame is processed to recognize an orientation and configuration of the hand 35. In this example, the configuration of the hand 35 recognized at step 304 is considered to be a current hand configuration performed in the current frame. At step 305, the current hand configuration is added to a queue of hand configurations stored, e.g., in memory 208. Each hand configuration stored in the queue includes a timestamp indicating the time at which the corresponding video frame 800 was captured. Additionally, an indication of the position of the hand within the frame is also stored with the hand configuration. For example, as discussed earlier a distance between a reference point 25 on the hand 35 and a reference point in the video frame 800, such as the left edge 815 is also stored with each hand configuration in the gesture queue. At step 306, hand configurations, including positions and timestamps, stored in the gesture queue are used to identify a current dynamic gesture, i.e. a movement of the hand 35 over the course of multiple frames.

At step 307, the gesture recognition system 220 determines whether dragging mode for the UI control element has been activated. In this disclosure, "dragging mode" is a user input mode for a UI control element to enable interaction with and manipulation of a draggable element of the UI control element. If dragging mode for the UI control element has not been activated, then at step 308, the gesture recognition system 220 determines whether the recognized dynamic hand gesture is a dragging mode activation hand gesture. If, at step 308, the recognized hand gesture is not a dragging mode activation hand gesture, then the recognized hand gesture is not treated as a dragging mode hand gesture and it is processed as another gesture at step 332. After step 332, control goes back to step 302 via the junction 'A', to receive another frame from the image-capturing device, such as digital camera 102. If, at step 308, the gesture recognition system 220 determines that the recognized hand gesture was a dragging mode activation hand gesture, then the gesture recognition system provides an indication to the UI control module 230 indicating that a dragging mode activation hand gesture was detected. At step 312, the UI control module 230 activates dragging mode. After step 312, control returns, via the junction 'A', to step 302 to receive another frame.

If, at step 307, the gesture recognition system 220 determines that the dragging mode has been activated, then control goes to step 310. At step 310, if the gesture recognition system 220 determines that the recognized hand gesture is a dragging mode deactivation hand gesture, the gesture recognition system 220 provides an indication to the UI control module 230 that a dragging mode deactivation hand gesture has been detected. Control then goes to step 314. At step 314, the UI control module deactivates dragging mode and control goes back to step 302 via the junction 'A'.

If at step 310, the gesture recognition system 220 determines that the detected hand gesture was not a dragging mode deactivation hand gesture, then control goes to step 316.

If, at step 316, the gesture recognition system 220 determines that the recognized hand gesture is not a dynamic dragging gesture, then the recognized hand gesture is ignored as it is not a gesture that triggers any action in dragging mode. The recognized hand gestures is ignored by the gesture recognition system 220 and control goes back to step 302 via the junction 'A'. If, however, at step 316, the recognized hand gestures is a dynamic dragging hand gesture, then control goes to step 318 where the CD gain module 240 determines the current hand speed based on initial and subsequent hand locations and timestamps as described above. At step 320, the CD gain module 240 sets the CD gain based on the hand speed. At step 324, the CD gain module 240 sets a corresponding feedback volume based on the determined hand speed. At step 322, a sound module 250 connected to a speaker 120 plays a feedback tone at the feedback volume level configured by the CD gain module and provided to the sound module 250. The method then proceeds back to step 302, via the junction "A", to receive and process more frames.

The algorithm for setting the feedback volume level, as implemented by the CD gain module 240, is determined by equation 1 below.

$$f(s) = \begin{cases} a, & s \leq c \\ 0, & s \geq d \\ a * \left(\dfrac{d-s}{d-c}\right), & c < s < d \end{cases} \quad \text{Equation 1}$$

In Equation 1, the function f(s) is a function that determines the current feedback volume based on the determined hand speed (s) of a dynamic hand gesture. As discussed above, the speed (s) is between a first position and a second position for a hand during a recognized dynamic hand gesture. The CD gain is directly proportional to the detected speed. Accordingly, when the hand is moving slowly (i.e. with a slow speed (s)) in a recognized dynamic hand gesture, the CD gain is low and fine control of UI controls such as slider bars is possible. Conversely, when the hand is moving with a fast speed (s), the CD gain is high and coarse control of UI controls such as slider bars is enabled.

In the embodiment represented by Equation 1, the feedback volume is loudest (highest) when the CD gain is low, indicating fine control of UI controls. This is represented by the first line of Equation 1, which indicates that volume (f(s)) is set to (a), which is the maximum volume, when the speed (s) is below a lower speed limit (c). In other words, if the hand is moving with a particular speed (c) or slower, the feedback volume is set to the maximum value (a) indicating that the lowest CD gain is configured thus giving the finest control of a user interface control. If the hand is moving with a speed (s) which is equal to or higher an upper speed limit (d), as indicated in the second line of Equation 1, then the feedback volume is set to 0, i.e. the feedback tone is muted. This represents the highest possible CD gain giving the coarsest control of a UI control. In between the upper speed limit (c) and the lower speed limit (d), the feedback volume is linear with respect to the detected hand speed. With reference to the third line of Equation 1, as the speed (s) decreases, but is still higher than the lower limit (c), the term (d-s) in the numerator increases in value thus resulting in a higher volume. Conversely, as the speed (s) increases, but is still lower than the lower limit (d), the term (d-s) in the numerator decreases thus resulting in a lower volume. Accordingly, between the lower speed limit (c) and the higher speed limit (d), the feedback volume has a linear relationship with the hand speed between a first position and a second position within a dynamic gesture.

In some embodiments, the feedback tone is not continuous but rather a sequence of beeps played at a particular interval. In some embodiments, the interval between two successive beeps is configurable based on the UI control element. In one example, the UI control element is a slider bar representing the playback of a movie in a media application. The draggable element of the slider bar element may be used to fast forward within the movie. The feedback beep may be configured to beep every 1-minute or 30 seconds, which are fast-forwarded in the movie.

It should be noted that the method 300 may be executed a plurality of times within a single dynamic gesture. For example, at step 306 a dynamic sub-gesture may be recognized although the hand may still be moving. Accordingly, the method 300 may be executed to determine a hand speed between a first position and a second position and a feedback volume is set. When control returns to step 302, newly captured video frames 800 may contain a continuation of the dynamic hand gesture in which the hand has moved to a third position. In this case, the step 318 determines the current hand speed based on the distance travelled between the second and third positions and on the difference between a third time stamp of the third position and a second time stamp of the second position. This is repeated as many times as needed as long as a dragging mode deactivation gestures is not recognized. Accordingly, within a long dynamic gesture, such as a dynamic dragging hand gesture, a plurality of different hand speeds may be determined. A corresponding plurality of different feedback volumes may be determined, by the CD gain module 240 based on the plurality of different hand speeds. As such, as the user performs gestures with varying speeds, the sound module 250 may be playing tones with corresponding varying volumes through the speaker 120.

Figure 8:
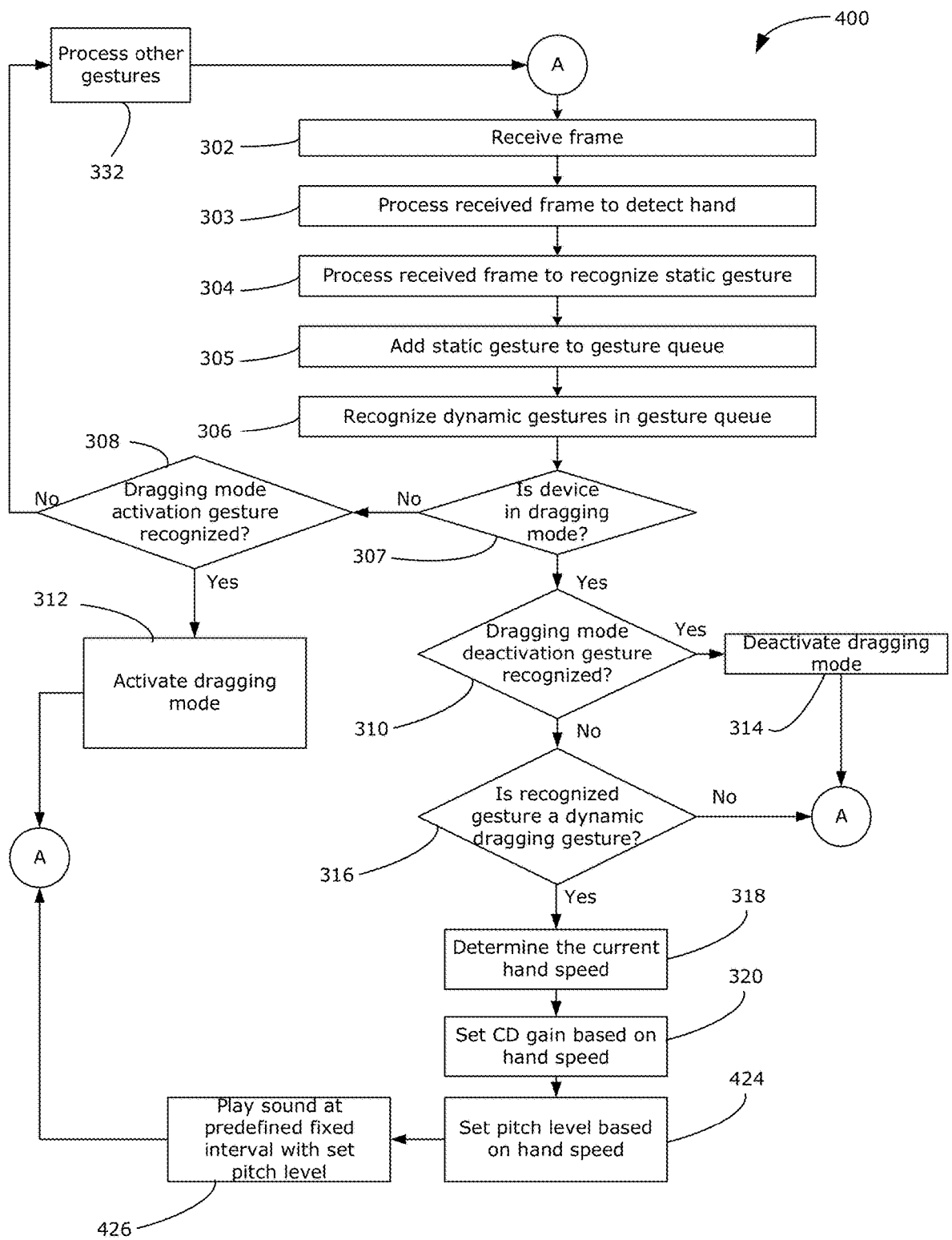
FIG. 8 is a flow chart illustrating a method for providing auditory feedback for a control display gain of a slider control on a gesture-controlled device by varying an audio pitch, in accordance with embodiments of the present disclosure.

As discussed above, in another example embodiment, the CD gain may indicated by changing the pitch level of an audio tone. With reference to FIG. 8, there is shown a method 400 for adaptive auditory feedback of active CD gain by varying the pitch level of a system sound, in accordance with embodiments of the present disclosure. Many of the steps of the method 400 are similar to, and have the same reference numerals as, the corresponding steps in the method 300 of FIG. 7. Accordingly, these steps are not going to be described again. With reference to FIG. 8, at step 424, the CD gain module sets the pitch level of the played sound to a level, which depends on the determined hand speed at step 318. For example, the CD gain module 240 determines that a hand is moving slowly indicating a high precision adjustment of a slider bar with a low CD gain. The CD gain module 240 accordingly sets the feedback tone to a low pitch sound. Conversely, when the CD gain module 240 determines that a faster hand movement indicating a coarser adjustment of the slider bar, the CD gain module 240 sets the feedback tone to a high pitch sound. This is demonstrated by Equation 2 below.

$$g(s) = \begin{cases} b, & s \leq c \\ b + \alpha s, & s > c \end{cases} \quad \text{Equation 2}$$

With reference to Equation 2, g(s) is a function that determines the current feedback pitch level based on the hand speed (s). When the detected hand speed (s) is slower than or equal to a lower speed limit (c), the CD gain module 240 fixes the tone of the feedback sound a fixed pitch value of (b). Conversely, when the detected hand speed (s) is faster than the lower speed limit, the tone of the feedback sound (tone) has a pitch value which increases linearly with the speed (s) as shown in the second line of Equation 2. The pitch value determined by the second line of Equation 2 is equal to the fixed pitch value (b) plus a linear pitch value determined by the speed (s) and a constant coefficient a. After the feedback audio pitch level has been set, at step 426 the feedback sound is played at the newly set pitch level (value). In some embodiments, the feedback sound is played at predefined fixed intervals with the set pitch level.

While Equation 2 increases the pitch value linearly with the hand speed (s), other relations between the detected hand speed and the pitch level are also contemplated. For example, Equation 2 may specify that the pitch value is proportional to the square of the detected hand speed (s). Alternatively, the pitch level may vary exponentially or logarithmically with the speed (s). In general, the pitch level is directly proportional to the detected hand speed (s), when the speed (s) is above (i.e. faster than) a lower speed limit.

While the aforementioned embodiments provided auditory feedback to indicate the current CD gain value, in some applications providing visual feedback is more appropriate. For example, in user interface employing a slider bar, visual feedback mechanisms confirm that the user's intended changes to the CD gain have been applied.

In one method, the slider bar 60 is modified to reflect the current CD gain by varying the spacing between the scale ticks 65 of the slider bar 60 based on the current CD gain. When the CD gain is high, as a result of recognizing a dynamic hand gesture with a high speed, the spacing between the scale ticks of a slider control is increased, and as a result, fewer ticks are displayed. The increase in spacing between the scale ticks indicates that the draggable element will be dragged at a higher speed in response to the dynamic hand gesture. Accordingly, this results in a coarse adjustment of a system parameter associated with the slider bar 60. Conversely, when the CD gain is low, as a result of recognizing a dynamic hand gesture with a low speed, the spacing between the scale ticks of a slider control is increased, and as a result, more ticks are displayed along the slider bar. The decrease in spacing between the scale ticks, and as a result the higher number of ticks displayed, indicates that the draggable element will be dragged at a lower speed in response to the dynamic hand gesture. Accordingly, this assists in making a fine adjustment of a system parameter associated with the slider control.

Figure 9:
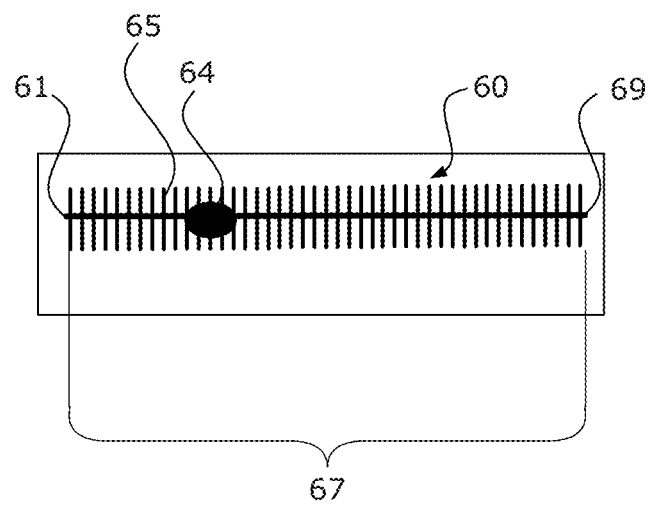
FIG. 9 is a diagram illustrating providing visual feedback of a low CD gain of a slider bar by increasing the spacing between scale ticks thereof, in accordance with embodiments of the present disclosure.
Figure 9:
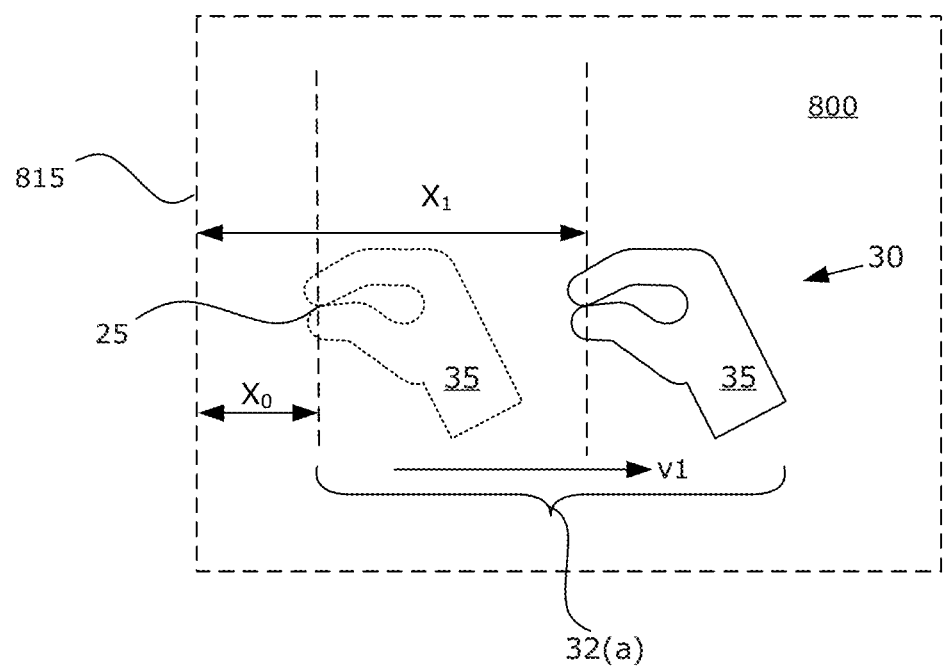
Figure 10:
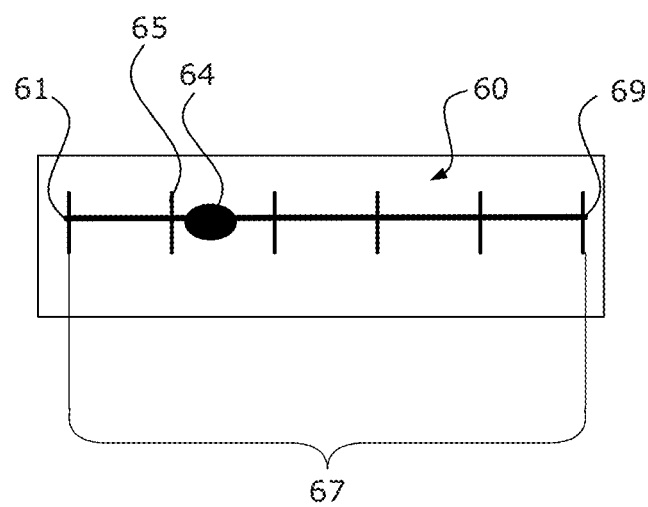
FIG. 10 is a diagram illustrating providing visual feedback of a high CD gain of a slider bar by decreasing the spacing between scale ticks thereof, in accordance with embodiments of the present disclosure.
Figure 10:
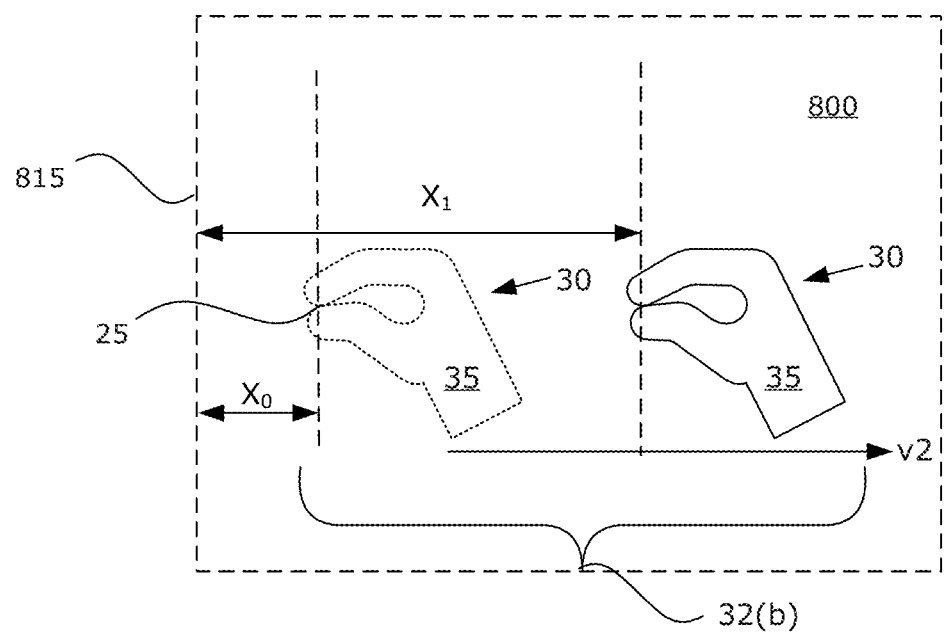

With reference to FIGS. 9 and 10, a dynamic dragging gesture 32 including the movement of the hand 35 with a particular speed (v) is recognized by the gesture recognition system 220 of a gesture-controlled device 100. As discussed above, the CD gain module 240 computes the CD gain as a function of the speed, i.e. $CD_{gain}=c*v$. To provide visual feedback for the computed CD gain, the spacing between the scale ticks surrounding the slider element 64 of the slider bar 60 is adjusted. The number of ticks displayed is equal to the length of the slider bar 60 divided by the tick spacing. Accordingly, the smaller the tick spacing, the higher the number of scale ticks 65 displayed along the slider bar 60. The CD gain module 240 computes the spacing between scale ticks 65A and 65B as $f(g)=k*CD_{gain}$, where (k) is a constant value. The spacing between the scale ticks is directly proportional to the CD gain. The higher the CD gain, the larger the spacing and vice versa.

With reference to FIG. 9, the gesture recognition system recognizes a dynamic dragging gesture 32 in which the hand 35 is moving with a speed (v1). The CD gain module 240, computes the CD gain as $CD_{gain}=c*v1$. In this example, the speed (v1) is slow. Accordingly, the computed CD gain is low allowing for fine adjustment of the slider element 64 of the slider bar 60. The CD gain module 240 computes the spacing between scale ticks 65 on the computed CD gain. The computed spacing between scale ticks 65 is narrow since $CD_{gain}$ is small. Accordingly, as shown in FIG. 9, the spacing between scale ticks 65 is made small and as a result, a higher number of ticks are displayed. The change in spacing between scale ticks 65 and the higher number of the scale ticks 65 displayed provides visual feedback indicating that the CD gain is low and that fine movement of the slider element 64 is possible. The fine movement of the slider element 64 allows for precise adjustment of a system parameter associated with the slider bar 60.

With reference to FIG. 10, the gesture recognition system recognizes a dynamic dragging gesture 32 in which the hand 35 is moving with a speed (v2). The CD gain module 240, computes the CD gain as $CD_{gain}=c*v2$. In this example, the speed (v2) is fast. Accordingly, the computed CD gain is high allowing for coarse adjustment of the slider element 64 of the slider bar 60. The CD gain module 240 computes the spacing between scale ticks 65 based on the computed CD gain. The computed spacing between scale ticks 65A and 65B is wide since $CD_{gain}$ is large. Accordingly, as shown in FIG. 10, the spacing between scale ticks 65 is made larger than in FIG. 10. The change in spacing between scale ticks 65 provides visual feedback indicating that the CD gain is high and that coarse and fast movement of the slider element 64 is possible. The fast movement of the slider element 64 allows for coarse adjustment of a system parameter associated with the slider bar 60.

Figure 11:
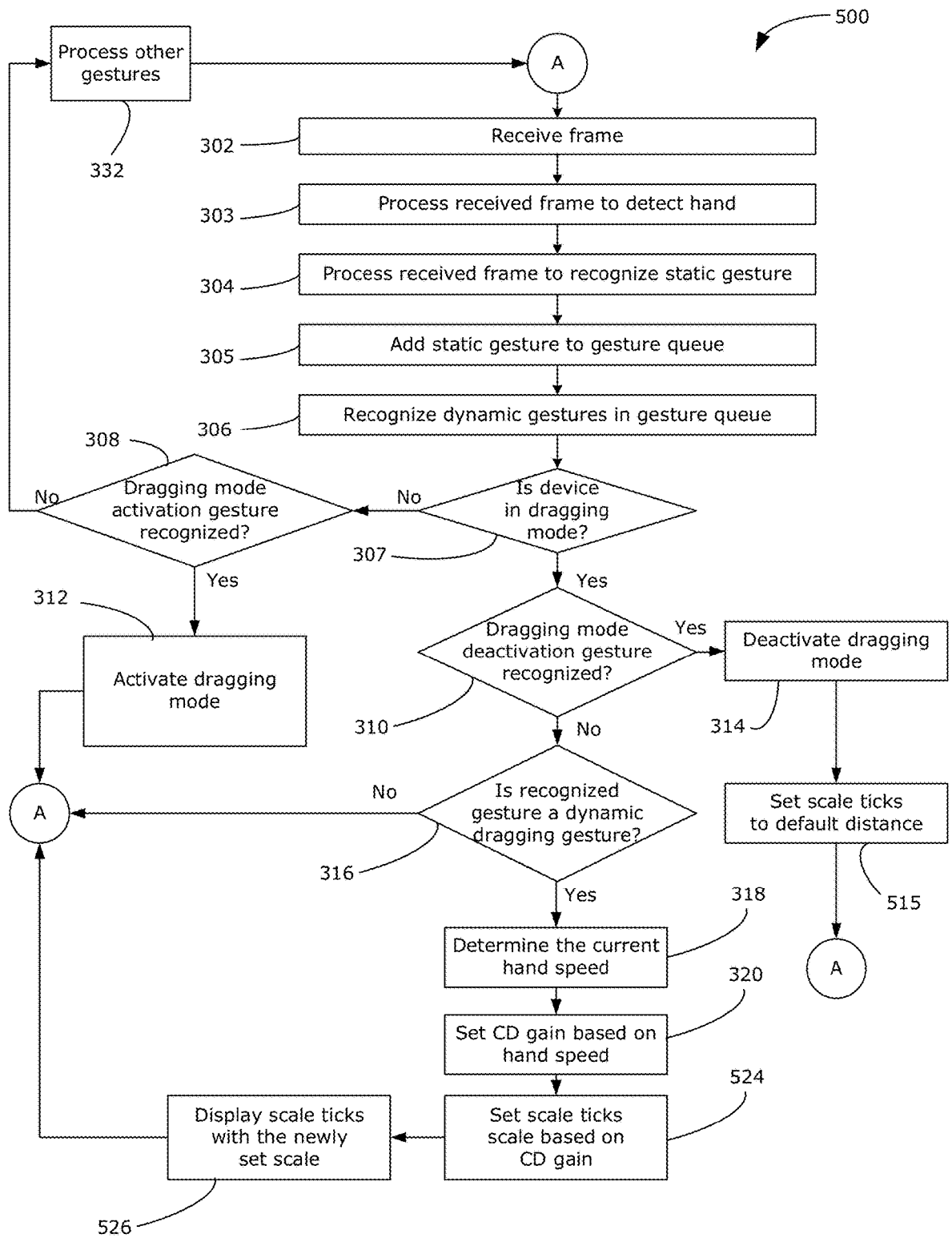
FIG. 11 is a flow chart illustrating a method for providing visual feedback for the control display gain of a slider control on a gesture-controlled device by varying the spacing between scale ticks thereof, in accordance with embodiments of the present disclosure.

FIG. 11 depicts a method 500 for providing adaptive visual feedback for an active CD gain value by varying the spacing between scale ticks, in accordance with an embodiment of the present disclosure. Many of the steps of the method 500 are similar to, and have the same reference numerals as, the corresponding steps in the method 300 of FIG. 7. Accordingly, these steps are not going to be described again. At step 310, if the gesture recognition system 220 recognizes a dragging mode deactivation gesture, control goes to step 314. At step 314, dragging mode is deactivated. At step 515, the CD gain module 240 sets the spacing (or scale) between scale ticks of a slider control are set to their default distance. Control then returns to step 302 via the junction "A". At step 524, after the CD gain is set in step 320, the CD gain module 240 changes the spacing between (i.e. the scale of) the scale ticks of a slider control based on the CD gain set at step 320. At step 526, the UI control module 230 displays the scale ticks of the slider control with the newly set scale (or spacing), thus providing user feedback indicating the new CD gain.

Figure 12:
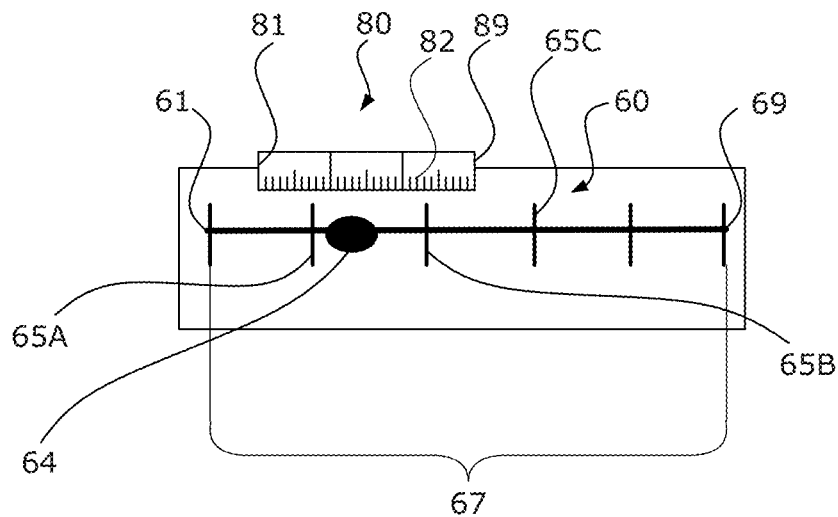
FIG. 12 is a diagram illustrating providing visual feedback for a low CD gain of a slider bar on a gesture-controlled device by displaying a ruler visualization, in accordance with embodiments of the present disclosure.
Figure 12:
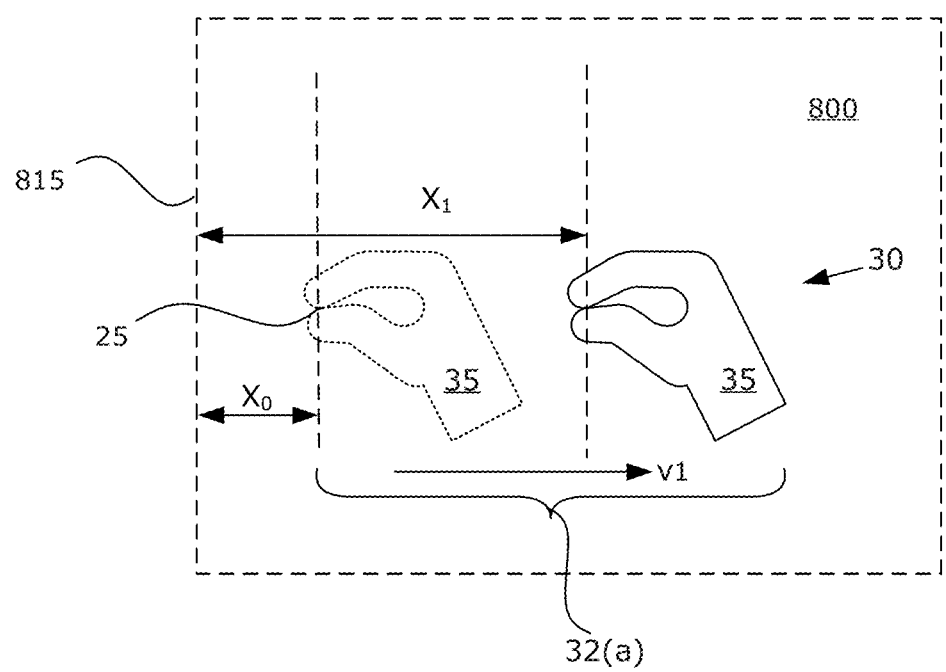

In some embodiments of the present disclosure, user feedback indicating CD gain value may utilize augmenting the user interface with temporary visualizations for fine-grained control of a slider control. Augmenting the user interface with such visualizations provides an opportunity to capture a user's attention towards the interaction area of the slider control. In one example, if the CD gain drops by a predefined threshold to a lower CD gain value, a temporary ruler type visualization appears on or near the interaction area of the slider control. For example, with reference to FIG. 12, when the gesture recognition system 220 recognizes dynamic dragging gesture 32, the CD gain module 240 determines the CD gain based on the hand speed (v1) as described earlier. The CD gain module 240 compares the newly determined CD gain with a predetermined initial CD gain value. If the newly determined CD gain is lower than the predetermined initial CD gain value, then the CD gain module directs the UI control module 230 to display a ruler 80. The ruler 80 is displayed, by the UI control module 230, to indicate that fine-grained control of a draggable element, such as slider element 64 of a slider control, such as slider bar 60 is possible. The ruler 80 has a first end 81 corresponding to a lower limit, and a second end 89 corresponding to an upper limit. The ruler also features a plurality of ruler ticks 82. In some embodiments, when the ruler 80 is displayed, the slider element 64 can be dragged towards the first end 81 or the second end 89 to adjust the value of a system parameter corresponding to the slider bar 60. In such embodiments, the ruler 80 and its first end 81 and second end 89 replace the scale ticks 65A and 65B of the slider bar 60. For example, when the gesture recognition system recognizes a dynamic dragging gesture 32 as shown, the slider element 64 can be moved to the right until it is aligned with the second end 89 of the ruler in order to set the value of the system parameter to the value previously represented by the scale tick 65B. Advantageously, the ruler 80 is longer than the distance between the scale ticks 65A and 65B, thus giving a larger range for moving the slider element 64 for finer grain control. Additionally, the plurality of ruler ticks 82 further assist in controlling the value of the system parameter with greater precision.

Figure 13:
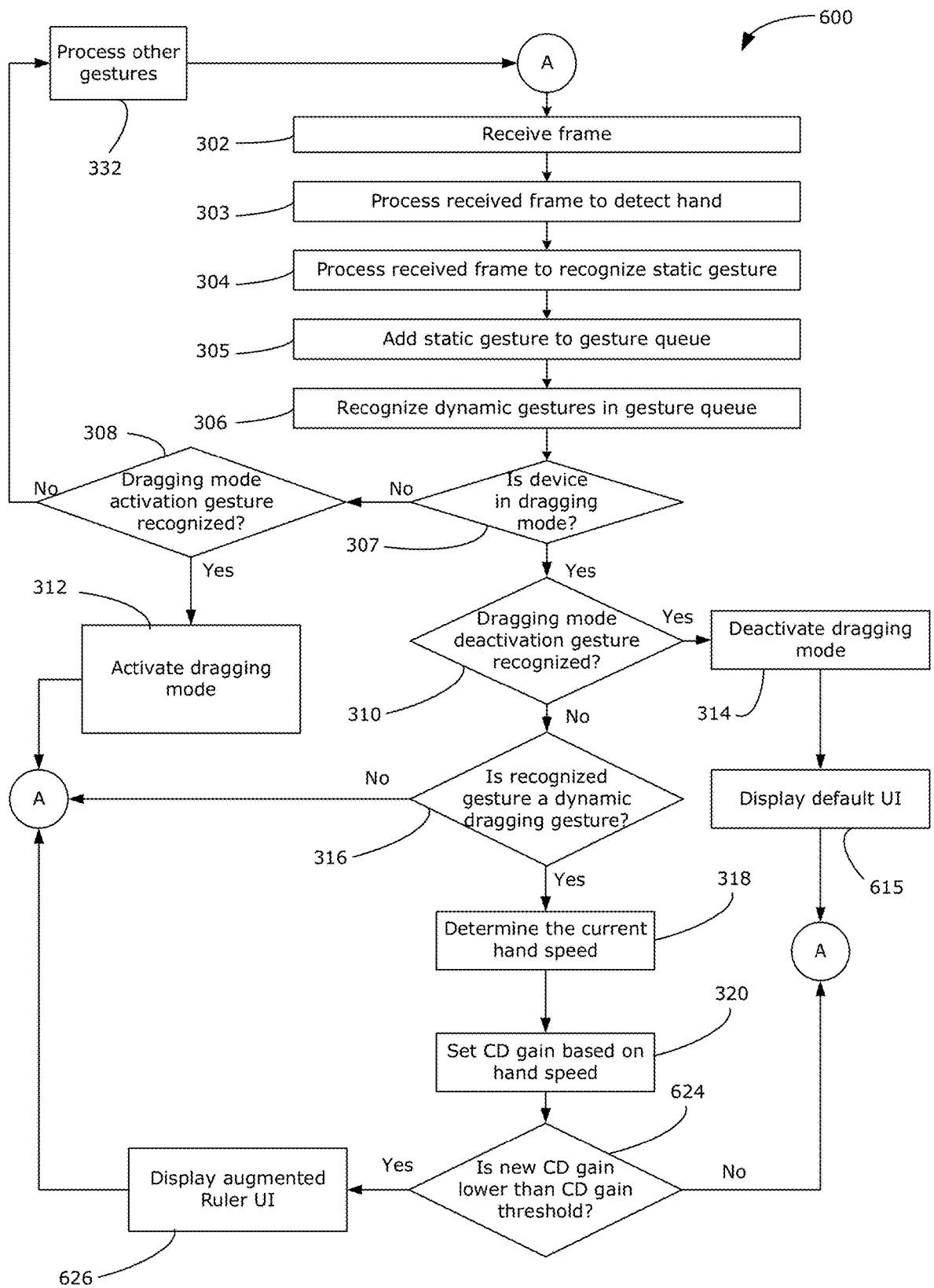
FIG. 13 is a flow chart illustrating a method for providing visual feedback for a low CD gain of a slider bar on a gesture-controlled device by displaying a ruler visualization, in accordance with embodiments of the present disclosure.

FIG. 13 depicts a method 600 for providing adaptive visual feedback for an active CD gain value by displaying an augmented ruler UI, in accordance with embodiments of the present disclosure. Many of the steps of the method 600 are similar to, and have the same reference numerals as, the corresponding steps in the method 300 of FIG. 7. Accordingly, these steps are not going to be described again. At step 310, if dragging mode deactivation gesture is recognized, control goes to step 314 where dragging mode is deactivated by the gesture recognition system 220. At step 615, the default UI is displayed, which does not include a ruler 80. At step 624, the newly set CD gain, at step 320, is checked against a threshold value. If the new CD gain is not lower than the threshold value, then no augmented ruler UI is displayed. At step 725, the default UI, i.e. the slider control with a default range, is displayed. Control then goes back to step 302 via the junction "A". If, at step 624, the new CD gain is lower than the CD gain threshold, then control goes to step 626 at which the UI control module 230 displays an augmented ruler UI containing a ruler type visualization such as ruler 80.

Figure 14:
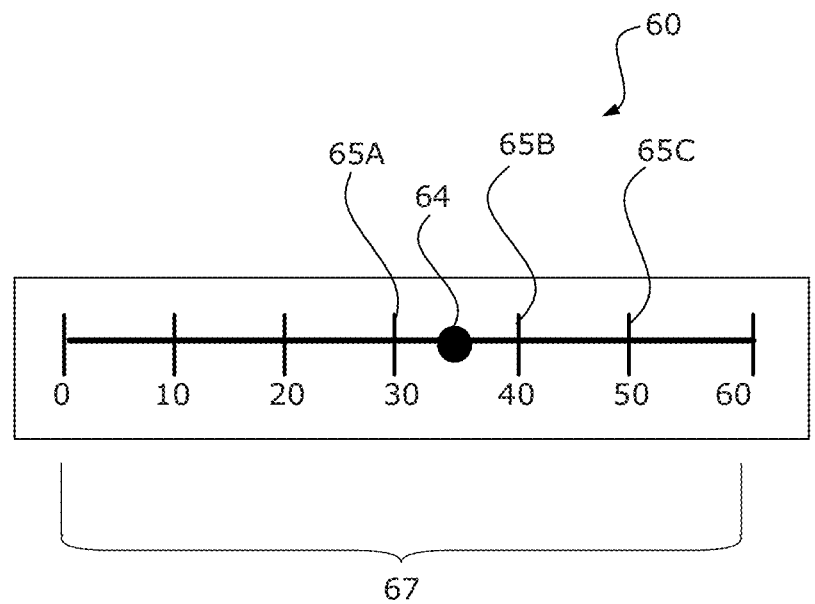
FIG. 14 is a diagram illustrating setting a high CD gain for a slider bar on a gesture-controlled device using a dynamic dragging gesture, in accordance with embodiments of the present disclosure.
Figure 14:
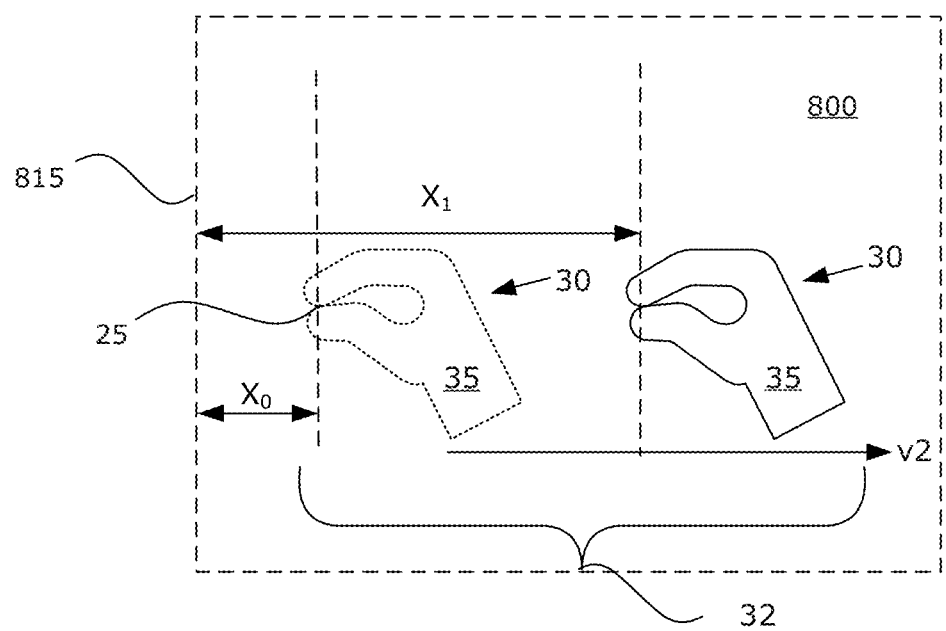
Figure 15:
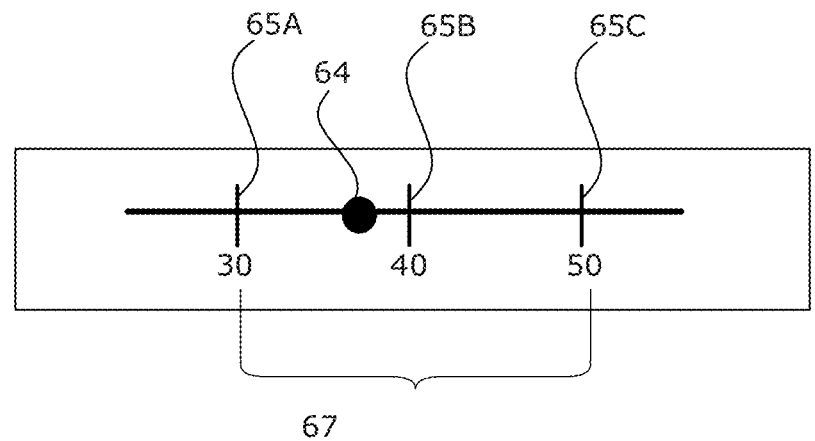
FIG. 15 is a diagram illustrating setting a low CD gain and providing visual feedback for the low CD gain of the slider bar of FIG. 14 by shortening the slider bar range, in accordance with embodiments of the present disclosure.
Figure 15:
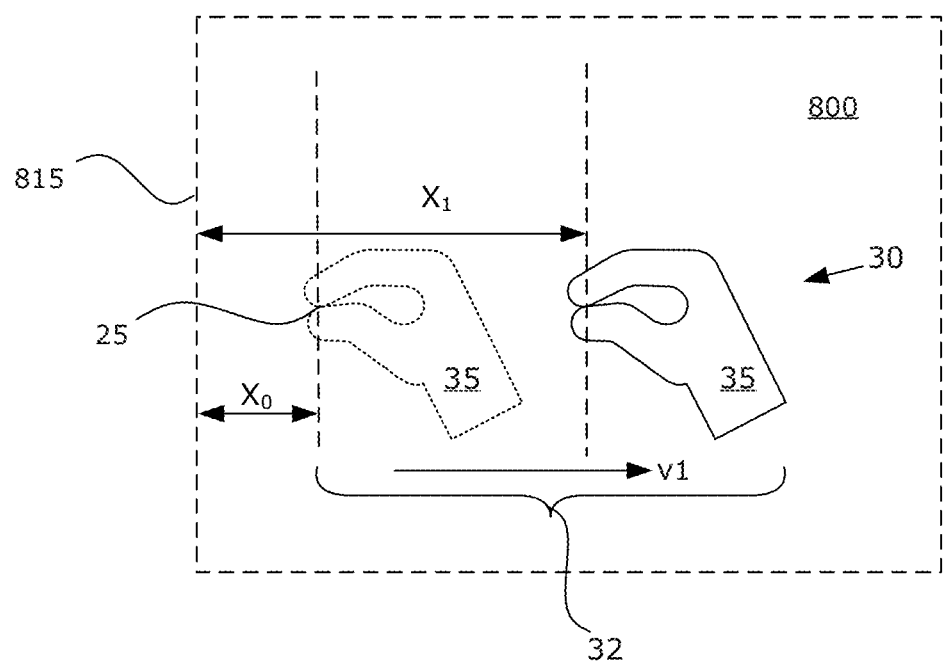

In some embodiments of the present disclosure, CD gain feedback may be provided by adjusting a slider control's range based on the current CD gain. For example, the slider control range may be shortened for more precise control when the CD gain is low. Conversely, the slider control range may be increased to provide coarse control when the CD gain is high. For example, with reference to FIGS. 14 and 15, there is shown a slider bar 60 having a range 67. In FIG. 14, a gesture recognition system 220 of a gesture-controlled device 100 detects a dynamic dragging gesture 32(a) having a high speed of movement. The CD gain module 240 sets the CD gain to a high value. Accordingly, the range 67 of the slider bar is set to a high range of 60 ranging from 0 at the far left end to 60 at the far right end. As the gesture recognition system 220 recognizes the dynamic dragging gesture 32(a), the slider element 64 is moved with a coarse resolution between the scale ticks representing the values 30 and 40. In FIG. 15, the gesture recognition system 220 detects a dynamic dragging gesture 32 having a slow speed of movement. As a result, the CD gain module 240 sets the CD gain to a low value. Additionally, the CD gain module configures the UI control module 230 to change the range of the slider bar to a shorter range with a higher resolution. As shown in FIG. 15, the scale of the slider bar is only 20 ranging from 30 at the left end to 50 at the right end. The shorter range 67 of the slider bar 60 allows for precise adjustment of the system parameter associated therewith as the slider element 64 can be moved with precision between values since the distance along the range 67 when it is in a short range mode is longer than it was with the slider bar 60 in a wider range mode as is the case in FIG. 14.

Figure 16:
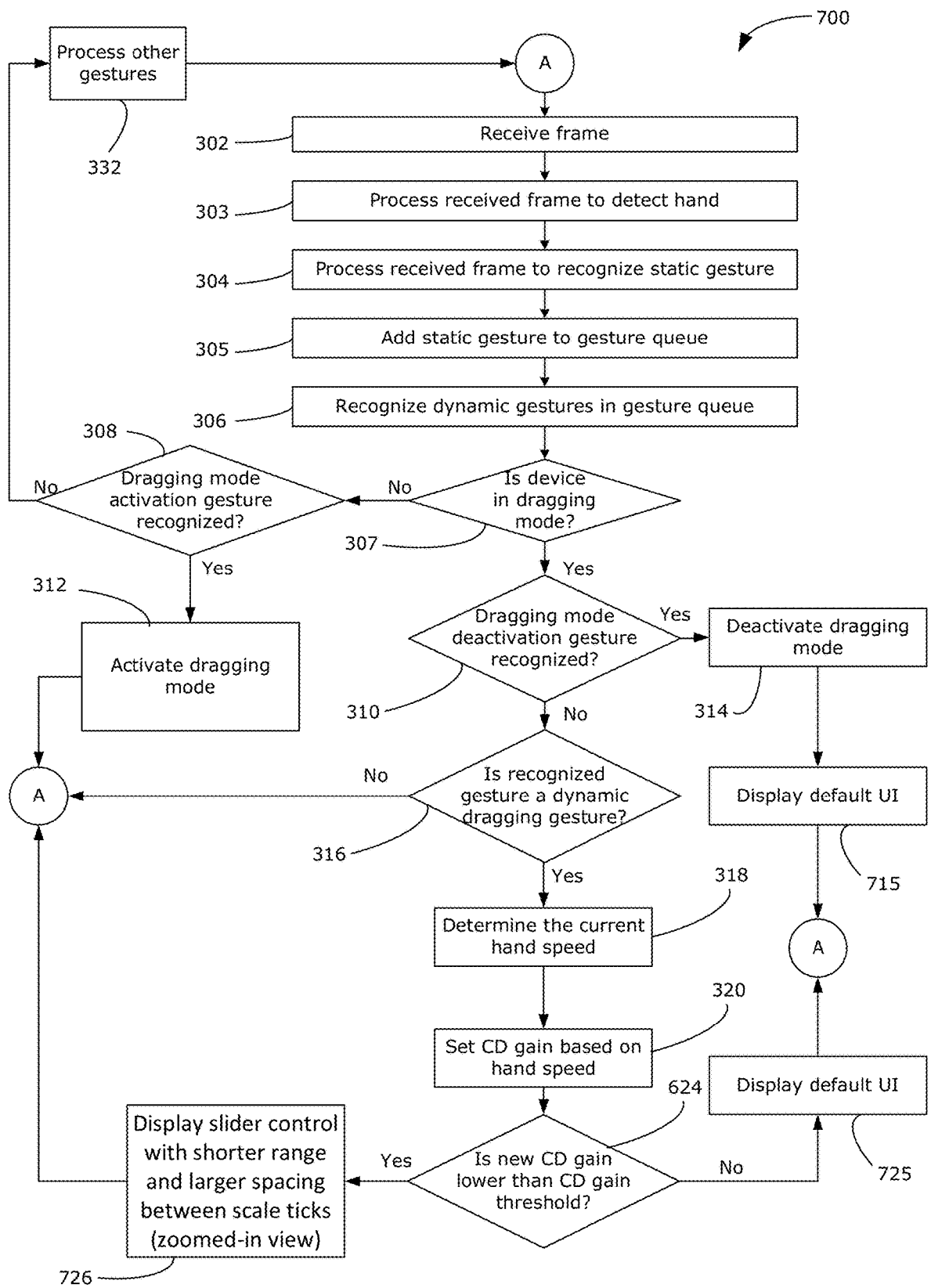
FIG. 16 is a flow chart illustrating a method for providing visual feedback for a low CD gain of a slider bar on a gesture-controlled device by shortening the slider bar range, in accordance with embodiments of the present disclosure.

FIG. 16 depicts a method 700 for providing adaptive visual feedback for an active CD gain value by adjusting the range of a slider control, in accordance with embodiments of the present disclosure. Many of the steps of the method 700 are similar to, and have the same reference numerals as, the corresponding steps in the method 300 of FIG. 7. Accordingly, these steps are not going to be described again. At step 310, if dragging mode deactivation gesture is recognized, control goes to step 314 where dragging mode is deactivated by the gesture recognition system 220. At step 715, the default UI is displayed, in which the slider control is displayed with its default range, such as the range 67 in FIG. 14. At step 320, a new CD gain is set based on the determined hand speed in a recognized dynamic hand gesture. At step 624, the newly determined CD gain is compared with a CD gain threshold. If the newly determined CD gain is greater than or equal to the CD gain threshold, then the default UI for the slider control is displayed. In other words, the slider control is displayed with its default range, such as range 67 in FIG. 14. On the other hand, if at step 624 the newly determined CD gain is less than the CD gain threshold, control goes to step 726. At step 726, the slider control is displayed with a shorter range and larger spacing between the scale ticks thereof, such as shown in FIG. 15. In other words, the scale ticks are displayed in a zoomed-in view.

Figure 17A:
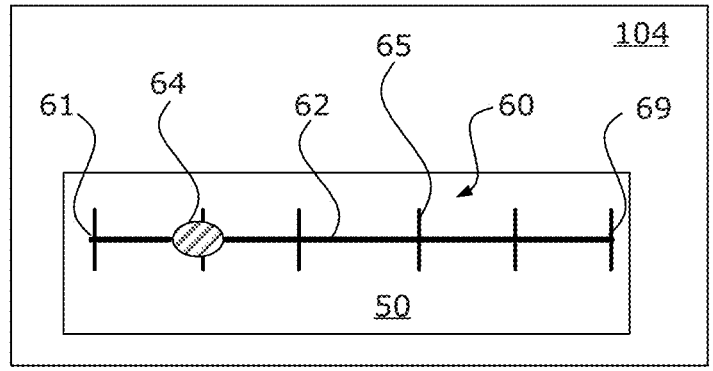
FIG. 17A is a diagram illustrating providing feedback for a low CD gain of a slider bar by setting the color of a draggable element thereof to a first color, in accordance with embodiments of the present disclosure.
Figure 17B:
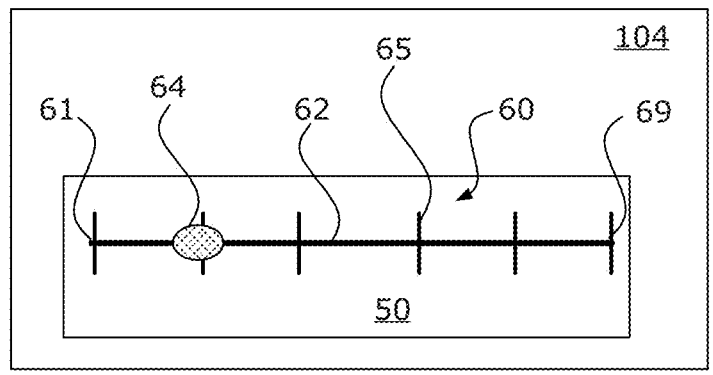
FIG. 17B is a diagram illustrating providing feedback for a high CD gain of a slider bar by setting the color of a draggable element thereof to a second color, in accordance with embodiments of the present disclosure.

In other embodiments of the present disclosure, providing visual feedback indicating CD gain may involve altering the appearance of a draggable element of a user interface control based on the CD gain. Altering the appearance of the draggable element may comprise, for example, changing the color or features of a slider element of a slider control. For example, with reference to FIG. 17A, a low CD gain determined by the CD gain module 240 may cause the UI control module 230 to display the slider element 64 of a slider bar 60 in a first color (shown as a hashed pattern). Conversely, with reference to FIG. 17B, a high CD gain determined by the CD gain module 240 may cause the UI control module 230 to display the slider element 64 in a second color (shown as a dotted pattern). Accordingly, the user is aware of the CD gain and may adjust their dynamic hand gesture accordingly.

In other example embodiments, a plurality of colors may represent different values of CD gain. For example, a linear interpolation between CD gains, which range from a lowest value to a highest value, may be used to determine the color of the slider element 64. For example, a color is usually specified as an RGB value. in some embodiments, the RGB values is a 24-bit number representing 16 million colors. The CD gain value may be multiplied by a scaling factor and mapped to the RGB color value. Accordingly, the color of the slider element 64 varies continuously with the changes in CD gain value. In other examples, a look-up table mapping a CD gain value range to a color may be used. In this case, different CD gain values cause the slider element 64 color to change accordingly.

Figure 18A:
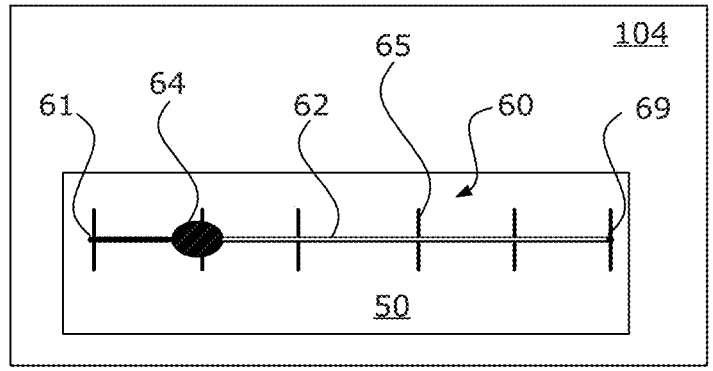
FIG. 18A is a diagram illustrating providing feedback for a low CD gain of a slider bar by setting the thickness of a track thereof to a first thickness, in accordance with embodiments of the present disclosure.
Figure 18B:
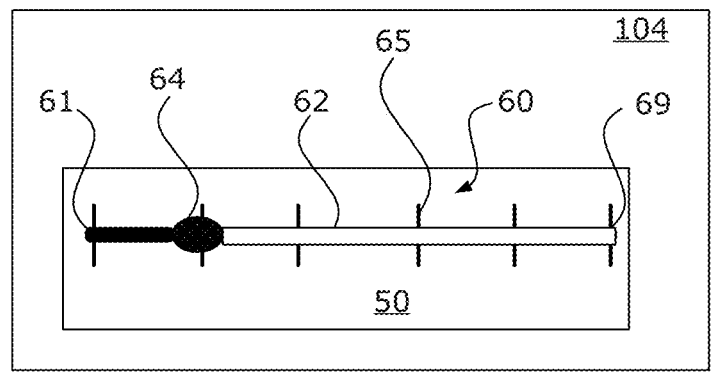
FIG. 18B is a diagram illustrating providing feedback for a high CD gain of a slider bar by setting the thickness of a track thereof to a second thickness, in accordance with embodiments of the present disclosure.

As another example, with reference to FIG. 18A, a low CD gain determined by the CD gain module 240 may cause the UI control module 230 to display the track 62 of a slider bar 60 with a first thickness, which is thin. Conversely, with reference to FIG. 18B, a high CD gain determined by the CD gain module 240 may cause the UI control module 230 to display the track 62 with a second thickness, which is greater than the first thickness. Accordingly, the user is aware of the CD gain and may adjust their dynamic hand gesture accordingly.

Figure 19A:
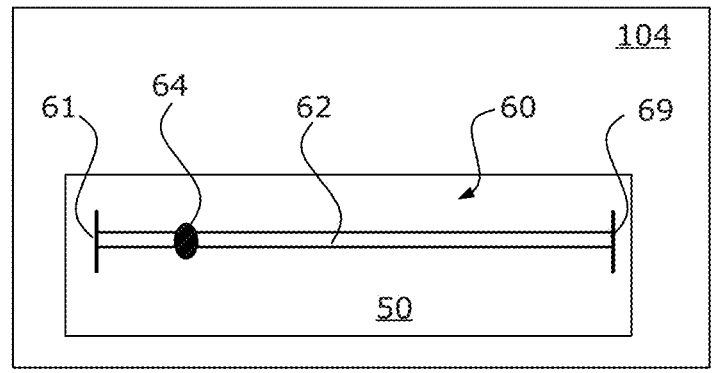
FIG. 19A is a diagram illustrating providing feedback for a low CD gain of a slider bar by setting the width of a slider element thereof to a first width, in accordance with embodiments of the present disclosure.
Figure 19B:
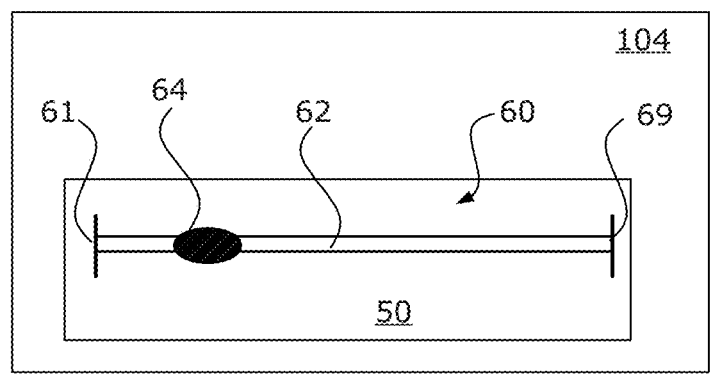
FIG. 19B is a diagram illustrating providing feedback for a high CD gain of a slider bar by setting the width of a slider element thereof to a second width, in accordance with embodiments of the present disclosure.

As another example, with reference to FIG. 19A, a low CD gain determined by the CD gain module 240 may cause the UI control module 230 to display the slider element 64 of a slider bar 60 with a first width which is small. Conversely, with reference to FIG. 19B, a high CD gain determined by the CD gain module 240 may cause the UI control module 230 to display the slider element 64 with a second width, which is greater than the first width. Accordingly, the user is aware of the CD gain and may adjust their dynamic hand gesture accordingly.

Figure 20A:
FIGS. 20A-20E are diagrams providing feedback for a high CD gain of a slider bar by displaying a tail for the draggable element based on the dragging speed of the draggable element, in accordance with embodiments of the present disclosure.
Figure 20B:
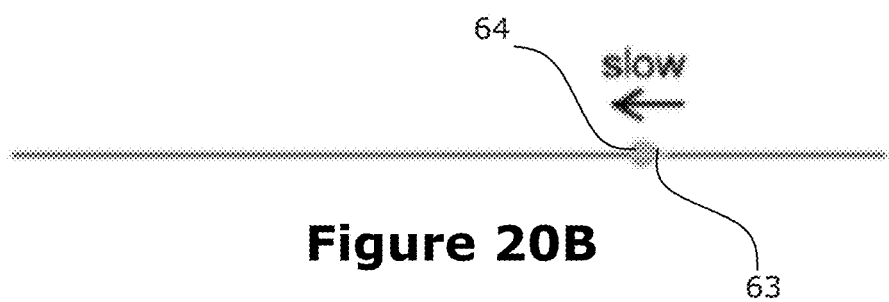
Figure 20C:
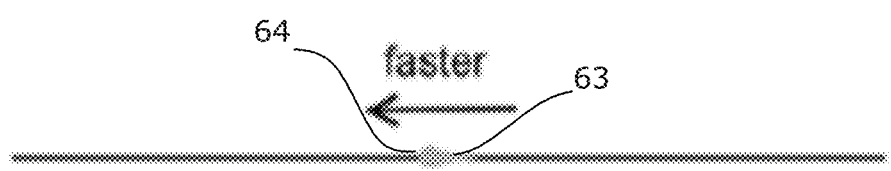
Figure 20D:
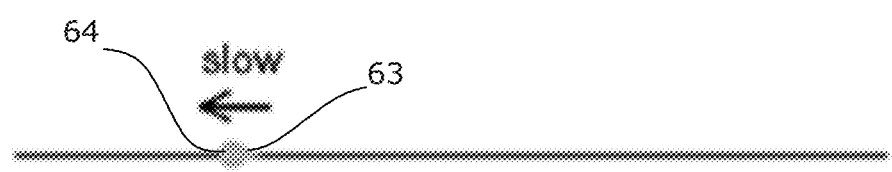
Figure 20E:
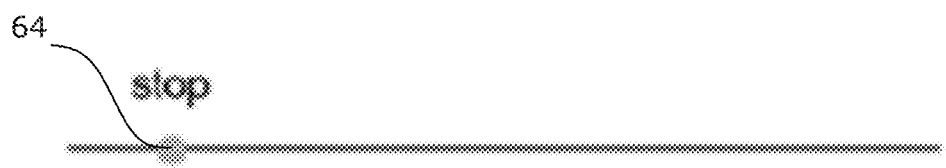

In some example embodiments, CD gain visual feedback is provided by altering the shape of the draggable element of a user interface control. For example, the shape of the slider element 64 of a slider bar 60 may be altered based on the CD gain, which is determined by the detected hand speed performing a dragging gesture. With reference to FIGS. 20A-20E, there is shown a slider bar 60 having slider element 64 as described before. In FIG. 20A, there is no detected gesture and the slider element 64 is stationary at a starting position. In FIG. 20B, and in response to recognizing a slow dragging hand gesture, and hence a low CD gain, the shape of the slider element 64 to show a small tail 63. The small tail 63 for the slider element 64 is shown at the side of the slider element 64, which is opposite the direction of movement of the slider element 64. The small size of the tail 63 indicates a low CD gain. As the recognized dragging hand gesture becomes faster, a higher CD gain is computed. The higher CD gain is indicated in FIG. 20C by the larger size of the tail 63 shown at the side of the slider element 64 opposite to the dragging direction of the slider element 64, which is determined by the direction of the recognized dragging mid-air hand gesture. If the recognized dragging mid-air hand gesture is slowed down, the computed CD gain is lower. This is shown in FIG. 20D by displaying a smaller tail 63 for the slider element 64. If the slider element 64 stops moving, in response to the termination of the recognized dragging mid-air hand gesture, then the tail 63 of the slider element 64 is removed, as shown in FIG. 20E.

In some example embodiments, CD gain visual feedback is provided by adding an indicator to the slider control, the indicator based on the CD gain. For example, the CD gain indicator may be an arrow that varies in length based on the CD gain. As another example, the indicator may be a gage such as a speedometer having a pointer, which indicates the current CD gain. As another example, the indicator may be an animation, which updates with a rate that is based on the CD gain.

Figure 21A:
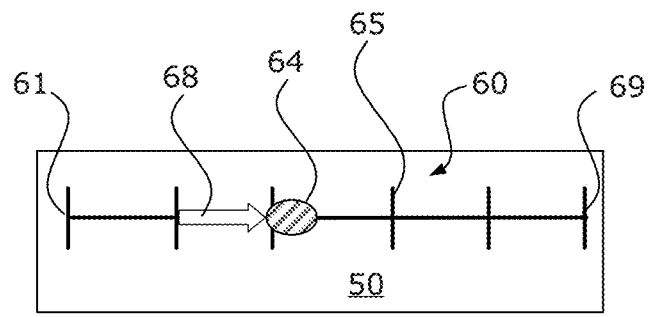
FIG. 21A is a diagram illustrating providing feedback for a low CD gain of a slider bar by displaying an arrow having a first length along the slider bar, in accordance with embodiments of the present disclosure.
Figure 21B:
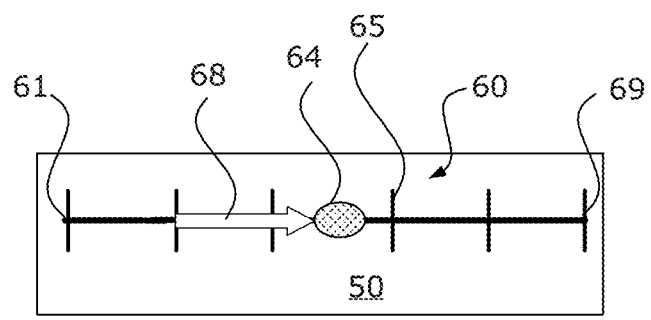
FIG. 21B is a diagram illustrating providing feedback for a high CD gain of a slider bar by displaying an arrow having a second length along the slider bar, in accordance with embodiments of the present disclosure.

As another example, with reference to FIG. 21A, a low CD gain determined by the CD gain module 240 may cause the UI control module 230 to display an arrow 68 having a short first length along the track 62 of a slider bar 60. Conversely, with reference to FIG. 21B, a high CD gain determined by the CD gain module 240 may cause the UI control module 230 to display an arrow 68 having a long second length along the track 62 of a slider bar 60. The long second length indicates a high CD gain, while the short first length indicates a low CD gain. Accordingly, the user is aware of the CD gain and may adjust their dynamic hand gesture accordingly.

Figure 22:
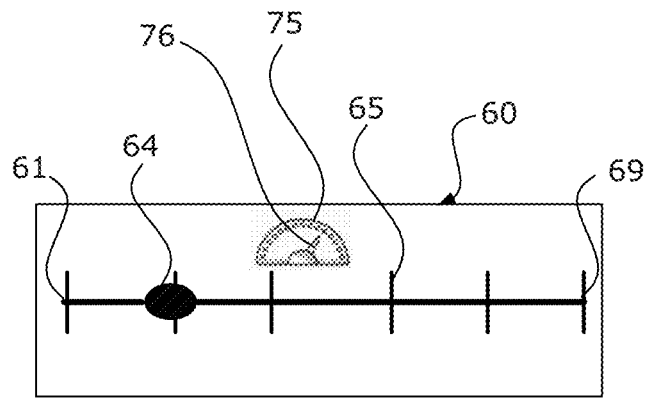
FIG. 22 is a diagram illustrating providing feedback for a CD gain of a slider bar by displaying a speedometer alongside the slider bar, in accordance with embodiments of the present disclosure.
Figure 23:
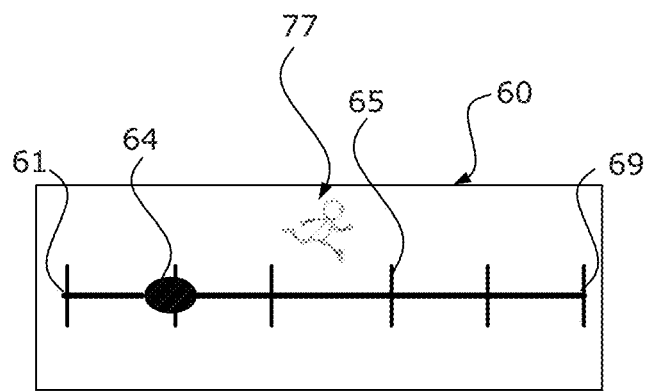
FIG. 23 is a diagram illustrating providing feedback for a CD gain of a slider bar by displaying an animation figure alongside the slider bar, in accordance with embodiments of the present disclosure.

As a further example, with reference to FIGS. 22 and 23, the CD gain determined by the CD gain module may cause the UI control module 230 to update an animation, which indicates the determined CD gain. For example, with reference to FIG. 22I, UI control module 230 displays a speedometer 75, which indicates whether the CD gain is high or low by means of a pointer 76 thereof. As another example, with reference to FIG. 23, an animation 77 of a person running is displayed in conjunction with the slider bar 60. In response to a high CD gain determined by the CD gain module 240, the UI control module 230 causes the animation 77 to move quickly indicating a high CD gain and a coarse movement of the slider element 64. Conversely, in response to a low CD gain, the UI control module 230 causes the animation 77 to move slowly indicating a low CD gain and a precise movement of the slider element 64. The animation updates based on the CD gain thus making the user aware of the CD gain. Accordingly, the user may adjust their dynamic hand gesture accordingly.

Figure 24:
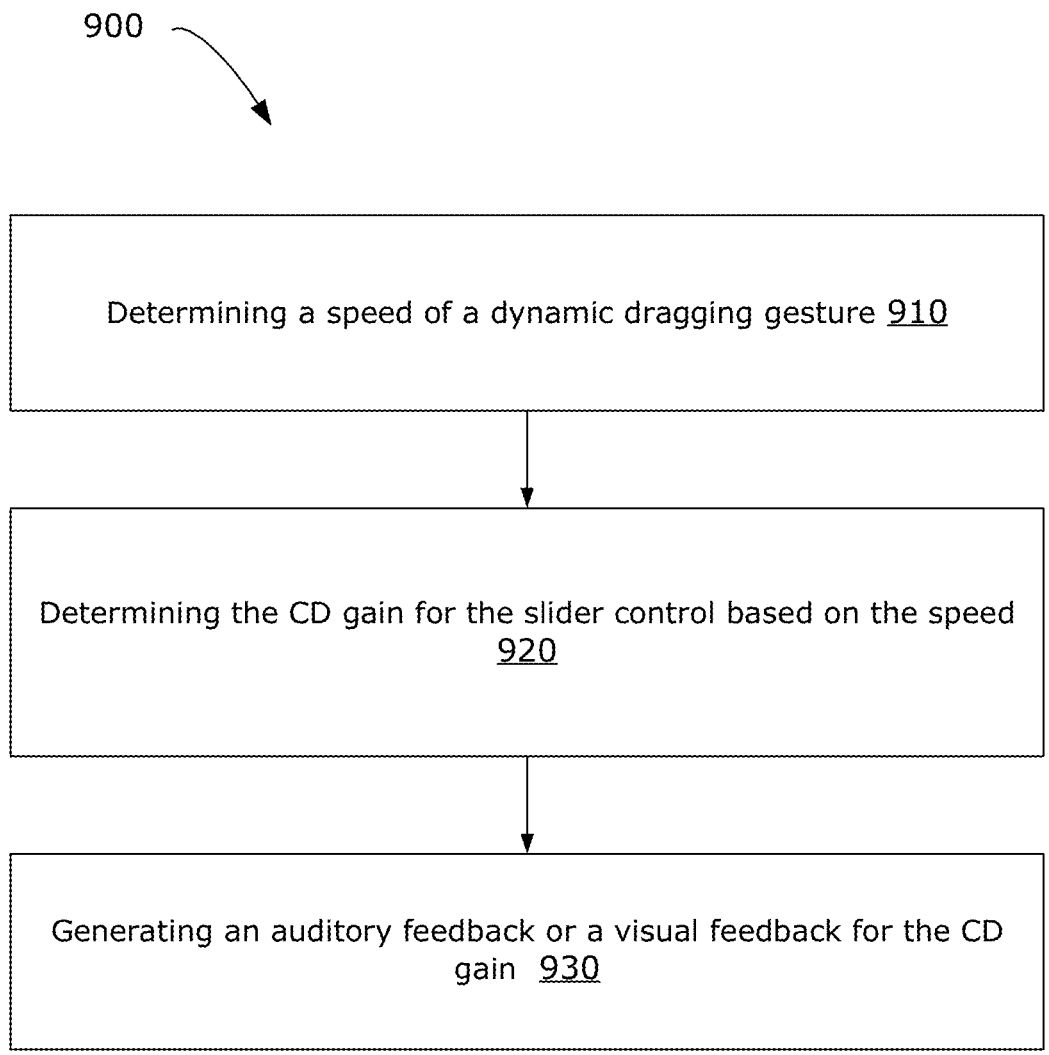
FIG. 24 is a flow chart illustrating a simplified method for providing feedback for CD gain on a gesture-controlled device, in accordance with embodiments of the present disclosure.

FIG. 24 depicts a simplified method 900 for providing visual or auditory feedback to CD gain of a slider control in a gesture-controlled device, in accordance with embodiments of the present disclosure. At step 910, the speed of a dynamic dragging gesture is determined by a component of the gesture-controlled device. At step 920, the CD gain for the slider control is determined, based on the speed of the dynamic dragging gesture. At step 930, auditory or visual feedback is generated for the CD gain.

Certain adaptations and modifications of the described embodiments can be made. Therefore, the above-discussed embodiments are considered illustrative and not restrictive.

The invention claimed is:

1. A method for providing feedback for a dynamic control display (CD) gain of a slider control on a gesture-controlled device, the method comprising:
   detecting, using an image-capturing device, a mid-air hand gesture conforming to a first dynamic dragging gesture over a respective first dragging distance;
   detecting a speed of the first dynamic dragging gesture;
   computing the CD gain for the slider control based on the speed and a gain factor, the slider control configuring a system parameter and the CD gain determining a granularity of control for the slider control for configuring the system parameter; and
   generating an auditory feedback or a visual feedback indicative of the CD gain with the first dragging distance for either coarse or fine adjustment of the system parameter, the auditory feedback or the visual feedback including at least one of:
   adjusting a spacing of a plurality of scale ticks of the slider control based on the CD gain, a decreased spacing of a plurality of scale ticks of the slider control configured for fine adjustment of the slider control and an increased spacing of a plurality of scale ticks configured for coarse adjustment of the slider control; or
   adjusting a range of the slider control based on the CD gain, a shorter range configured for precise adjustment of the slider control and an increased range configured for coarse adjustment of the slider control.

2. The method of claim 1, wherein:
generating the auditory feedback or the visual feedback comprises generating the auditory feedback comprising a sound played at predefined fixed intervals.

3. The method of claim 1, wherein:
generating the auditory feedback or the visual feedback comprises generating the auditory feedback including playing a sound with at least one of: a volume based on the CD gain; and
a pitch level based on the CD gain.

4. The method of claim 1, wherein:
generating the auditory feedback or the visual feedback comprises generating the visual feedback including displaying a ruler visualization when the CD gain is below a predefined threshold.

5. The method of claim 1, wherein:
generating the auditory feedback or the visual feedback comprises generating the visual feedback including altering an appearance of a draggable element of the slider control based on the CD gain.

6. The method of claim 5, wherein altering the appearance of the draggable element based on the CD gain comprises at least one of:
displaying the draggable element in a color based on the CD gain;
adjusting a width of the draggable element based on the CD gain; and displaying a tail for the draggable element, the tail having a length based on the CD gain.

7. The method of claim 1, wherein:
generating the auditory feedback or the visual feedback comprises generating the visual feedback including displaying an indicator along the slider control, the indicator providing an indication of the CD gain.

8. The method of claim 7, wherein the indicator comprises at least one of:
an arrow having a length based on the CD gain;
a speedometer having a pointer indicating the CD gain; and
an animation, which updates based on the CD gain.

9. A gesture-controlled device comprising:
an image-capturing device;
a processor; and
a memory coupled to the processor, the memory storing machine-executable instructions which, when executed by the processor, cause the gesture-controlled device to:
detect, using the image-capturing device, a mid-air hand gesture conforming to a first dynamic dragging gesture over a respective first dragging distance;
detect a speed of the first dynamic dragging gesture;
compute a CD gain for a slider control based on the speed and a gain factor, the slider control configuring a system parameter and the CD gain determining a granularity of control for the slider control for configuring the system parameter; and
generate an auditory feedback or a visual feedback indicative of the CD gain with the first dragging distance for either coarse or fine adjustment of the system parameter, the auditory feedback or the visual feedback including at least one of:
adjusting a spacing of a plurality of scale ticks of the slider control based on the CD gain, a decreased spacing of a plurality of scale ticks of the slider control configured for fine adjustment of the slider control and an increased spacing of a plurality of scale ticks configured for coarse adjustment of the slider control; or
adjusting a range of the slider control based on the CD gain, a shorter range configured for precise adjustment of the slider control and an increased range configured for coarse adjustment of the slider control.

10. The gesture-controlled device of claim 9, wherein the machine-executable instructions cause the gesture-controlled device to generate an auditory feedback, comprising a sound played at predefined fixed intervals.

11. The gesture-controlled device of claim 9, wherein the machine-executable instructions cause the gesture-controlled device to generate an auditory feedback including playing a sound with at least one of:
a volume based on the CD gain, and
a pitch level based on the CD gain.

12. The gesture-controlled device of claim 9, wherein the machine-executable instructions cause the gesture-controlled device to generate a visual feedback including displaying a ruler visualization when the CD gain is below a predefined threshold.

13. The gesture-controlled device of claim 9, wherein the machine-executable instructions cause the gesture-controlled device to generate a visual feedback including altering an appearance of a draggable element of the slider control based on the CD gain.

14. The gesture-controlled device of claim 13, wherein altering the appearance of the draggable element based on the CD gain comprises at least one of:
displaying the draggable element in a color based on the CD gain;
adjusting a width of the draggable element based on the CD gain; and
displaying a tail for the draggable element, the tail having a length based on the CD gain.

15. The gesture-controlled device of claim 9, wherein the machine-executable instructions cause the gesture-controlled device to generate visual feedback including displaying an indicator along the slider control, the indicator providing an indication of the CD gain.

16. A non-transitory computer-readable medium having machine-executable instructions stored thereon, the machine-executable instructions, when executed by a processor of a gesture-controlled device, cause the gesture-controlled device to:
detect, using an image-capturing device, a mid-air hand gesture conforming to a first dynamic dragging gesture over a respective first draggina distance;
detect a speed of the first dynamic dragging gesture;
compute a CD gain for a slider control based on the speed and a gain factor, the slider control configuring a system parameter and the CD gain determining a granularity of control for the slider control for configuring the system parameter; and
generate an auditory feedback or a visual feedback indicative of the CD gain with the first dragging distance for either coarse or fine adjustment of the system parameter, the auditory feedback or the visual feedback including at least one of:
adjusting a spacing of a plurality of scale ticks of the slider control based on the CD gain, a decreased spacing of a plurality of scale ticks of the slider control configured for fine adjustment of the slider control and an increased spacing of a plurality of scale ticks configured for coarse adjustment of the slider control; or
adjusting a range of the slider control based on the CD gain, a shorter range configured for precise adjustment of the slider control and an increased range configured for coarse adjustment of the slider control.

17. The method of claim 1 further comprising:
responsive to the auditory feedback or the visual feedback indicative of the first CD gain, detecting, using the image-capturing device, a sub-gesture of the mid-air hand gesture conforming to a second dynamic dragging gesture over a respective second dragging distance;
detecting a speed of the second dynamic dragging gesture, the second dynamic dragging gesture capturing a hand acceleration or a hand deceleration compared to the first dynamic dragging gesture;
updating the CD gain for the slider control based on the speed of the second dynamic dragging gesture;
generating a further auditory feedback or a further visual feedback indicative of the updated CD gain; and
further adjusting the system parameter based on the second dragging distance and the updated CD gain, the further auditory feedback or the further visual feedback for communicating whether the adjustment of the system parameter will be coarser or finer compared to the previous adjustment of the system parameter.

18. The gesture-controlled device of claim 9, wherein the machine-executable instructions which, when executed by the processor, further cause the gesture-controlled device to:

responsive to the auditory feedback or the visual feedback indicative of the first CD gain, detect, using the image-capturing device, a sub-gesture of the mid-air hand gesture conforming to a second dynamic dragging gesture over a respective second dragging distance;

detect a speed of the second dynamic dragging gesture, the second dynamic dragging gesture capturing a hand acceleration or a hand deceleration compared to the first dynamic dragging gesture;

update the CD gain for the slider control based on the speed of the second dynamic dragging gesture;

generate a further auditory feedback or a further visual feedback indicative of the updated CD gain; and further adjust the system parameter based on the second dragging distance and the updated CD gain, the further auditory feedback or the further visual feedback for communicating whether the adjustment of the system parameter will be coarser or finer compared to the previous adjustment of the system parameter.

* * * * *